US010681763B2

(12) United States Patent
Urushihara et al.

(10) Patent No.: US 10,681,763 B2
(45) Date of Patent: Jun. 9, 2020

(54) WIRELESS COMMUNICATION APPARATUS, CONNECTION MANAGEMENT APPARATUS, CONTENT DELIVERY SYSTEM, AND WIRELESS COMMUNICATION METHOD

(71) Applicant: Panasonic Intellectual Property Corporation of America, Torrance, CA (US)

(72) Inventors: Tomoya Urushihara, Kanagawa (JP); Koji Takinami, Kanagawa (JP); Naganori Shirakata, Kanagawa (JP); Masashi Kobayashi, Tokyo (JP); Hiroshi Takahashi, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 16/412,785

(22) Filed: May 15, 2019

(65) Prior Publication Data

US 2019/0268959 A1 Aug. 29, 2019

Related U.S. Application Data

(63) Continuation of application No. PCT/JP2017/041018, filed on Nov. 15, 2017.

(Continued)

(30) Foreign Application Priority Data

Sep. 19, 2017 (JP) ................................ 2017-179555

(51) Int. Cl.

*H04W 76/15* (2018.01)
*H04W 76/30* (2018.01)

(Continued)

(52) U.S. Cl.

CPC ............ *H04W 76/15* (2018.02); *G06F 13/00* (2013.01); *H04W 76/10* (2018.02); *H04W 76/30* (2018.02)

(58) Field of Classification Search

CPC ..... H04W 76/15; H04W 76/10; H04W 76/30; G06F 13/00

(Continued)

(56) References Cited

U.S. PATENT DOCUMENTS

2010/0064050 A1* 3/2010 Maruhashi .......... H04L 67/2842 709/229
2012/0302218 A1* 11/2012 Tsuda ...................... H04W 8/18 455/414.1

FOREIGN PATENT DOCUMENTS

JP 2015-118406 6/2015
WO 2010/090785 8/2010

OTHER PUBLICATIONS

International Search Report of PCT application No. PCT/JP2017/041018 dated Jan. 23, 2018.

* cited by examiner

*Primary Examiner* — Ayodeji O Ayotunde
(74) *Attorney, Agent, or Firm* — Seed IP Law Group LLP

(57) ABSTRACT

Connectability determining circuitry determines connectability over a millimeter wave band with respect to a content delivery apparatus. When a determination result of the connectability indicates that connection is enabled, request-signal generating circuitry generates a connection request signal for requesting connection over a millimeter wave band, from when undownloaded content is selected until download of the selected undownloaded content is requested, and transmits the connection request signal to the content delivery apparatus via millimeter-wave wireless circuitry. Control circuitry downloads the undownloaded (Continued)

content from the content delivery apparatus via the millimeter-wave wireless circuitry.

14 Claims, 30 Drawing Sheets

Related U.S. Application Data

(60) Provisional application No. 62/436,946, filed on Dec. 20, 2016.

(51) Int. Cl.
*H04W 76/10* (2018.01)
*G06F 13/00* (2006.01)

(58) Field of Classification Search
USPC .......................................................... 455/73
See application file for complete search history.

| CONTENT DELIVERY TERMINAL | USER TERMINAL | COMMUNICATION ENVIRONMENT | STATE |
|---|---|---|---|
| C1 | U1 | WITHIN AREA, COMMUNICATION QUALITY 10 | UNCONNECTED |

| No. | CONTENT DELIVERY TERMINAL | USER TERMINAL | COMMUNICATION ENVIRONMENT | STATE |
|---|---|---|---|---|
| 1 | C1 | U1 | WITHIN AREA, COMMUNICATION QUALITY 10 | UNCONNECTED |
| 2 | C1 | U2 | OUTSIDE AREA | UNCONNECTED |

WIRELESS COMMUNICATION APPARATUS, CONNECTION MANAGEMENT APPARATUS, CONTENT DELIVERY SYSTEM, AND WIRELESS COMMUNICATION METHOD

BACKGROUND

1. Technical Field

The present disclosure relates to a wireless communication apparatus that performs millimeter wave communication with a content delivery terminal, a connection management apparatus that manages connection between the content delivery terminal and the wireless communication apparatus, a content delivery system including the content delivery terminal and the wireless communication apparatus, and a wireless communication method for the wireless communication apparatus or the connection management apparatus.

2. Description of the Related Art

In recent years, a system in which, in only a specific area called a hotspot, a content delivery terminal (an access point) and user terminals perform millimeter wave communication with each other and the user terminals download content from content delivery terminal is becoming widespread (see Japanese Unexamined Patent Application Publication No. 2015-118406). The millimeter wave communication is, for example, communication defined by IEEE 802.11ad and IEEE 802.11ay.

SUMMARY

In millimeter wave communication, the number of user terminals that can simultaneously connect with a content delivery terminal is more limited than in microwave communication. Thus, when each user terminal is adapted to connect with the content delivery terminal at a timing when it enters the communication area of the content delivery terminal, the number of user terminals with which the content delivery terminal can simultaneously connect is exceeded, thus increasing the possibility of occurrence of a connection restriction. This makes it difficult for user terminals whose connections are restricted to perform download. Also, when each user terminal connects with the content delivery terminal after a download request occurs (for example, after the user clicks a download start icon), it takes time for the connection to increase the possibility that the waiting time from the occurrence of the download request to the start of communication.

One non-limiting and exemplary embodiment provides a wireless communication apparatus, a connection management apparatus, a content delivery system, and a wireless communication method that can avoid unwanted connection by a user terminal that does not execute download, can reduce the probability of occurrence of a connection restriction, and can reduce the waiting time from occurrence of a download request until the start of communication.

In one general aspect, the techniques disclosed here feature a wireless communication apparatus including: connectability determining circuitry that determines connectability over a millimeter wave band with respect to a content delivery apparatus that delivers one or more pieces of content; request-signal generating circuitry that generates a connection request signal for issuing a request for connection over the millimeter wave band to the content delivery apparatus; and wireless circuitry that performs wireless communication with the content delivery apparatus over the millimeter wave band to download the one or more pieces of content from the content delivery apparatus and to transmit the connection request signal to the content delivery apparatus. When a determination result of the connectability indicates that the connection is enabled, the request-signal generating circuitry generates the connection request signal from when undownloaded content of the one or more pieces of content is selected until download of the selected undownloaded content is requested.

According to one aspect of the present disclosure, since a user terminal that executes download using a millimeter wave communication is connected with high priority, it is possible to avoid unwanted connection by a user terminal that does not execute download, and it is possible to reduce the probability of occurrence of a connection restriction. Also, since connection is started prior to an actual download request, it is possible to reduce influences due to the waiting time for the connection, and it is possible to reduce the waiting time from when a download request occurs at the user terminal until the download is started.

It should be noted that general or specific embodiments may be implemented as a system, an apparatus, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Embodiments of the present disclosure will be described in detail with reference to the accompanying drawings, as appropriate. However, an overly detailed description may be omitted herein. For example, a detailed description of already well-known things and a redundant description of substantially the same configuration may be omitted herein. This is to avoid the following description becoming overly redundant and to facilitate understanding of those skilled in the art.

The accompanying drawings and the following description are provided so as to allow those skilled in the art to fully understand the present disclosure and are not intended to limit the subject matters recited in the claims. In the following description, an expression " . . . unit" used for each constituent element may be replaced with another expression, such as " . . . circuitry", " . . . device", " . . . unit", or " . . . module".

First Embodiment

<Overview of Content Delivery System>

First, an overview of a content delivery system 100*a* according to a first embodiment of the present disclosure will be described with reference to FIGS. 1 and 2.

Figure 1:
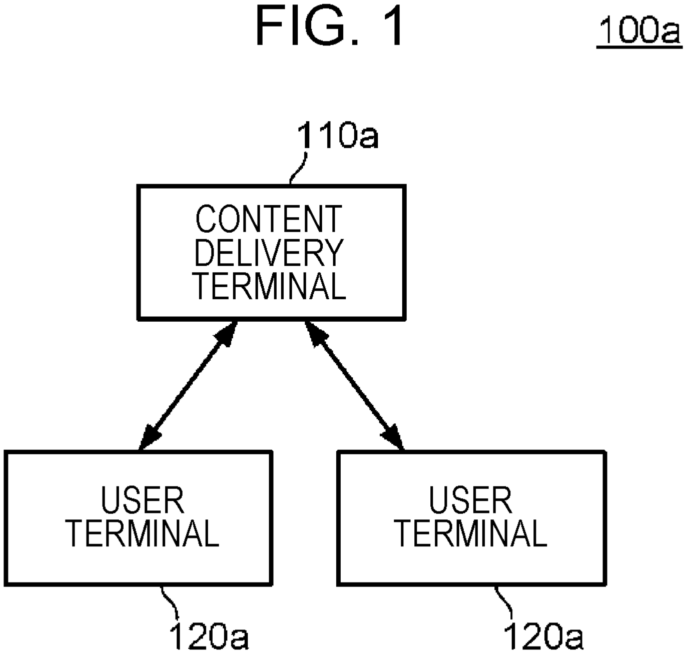
FIG. 1 is a diagram illustrating the configuration of a content delivery system according to a first embodiment of the present disclosure.

As illustrated in FIG. 1, the content delivery system 100*a* includes one content delivery terminal 110*a* and one or more (two, in FIG. 1) user terminals 120*a*.

Figure 2:
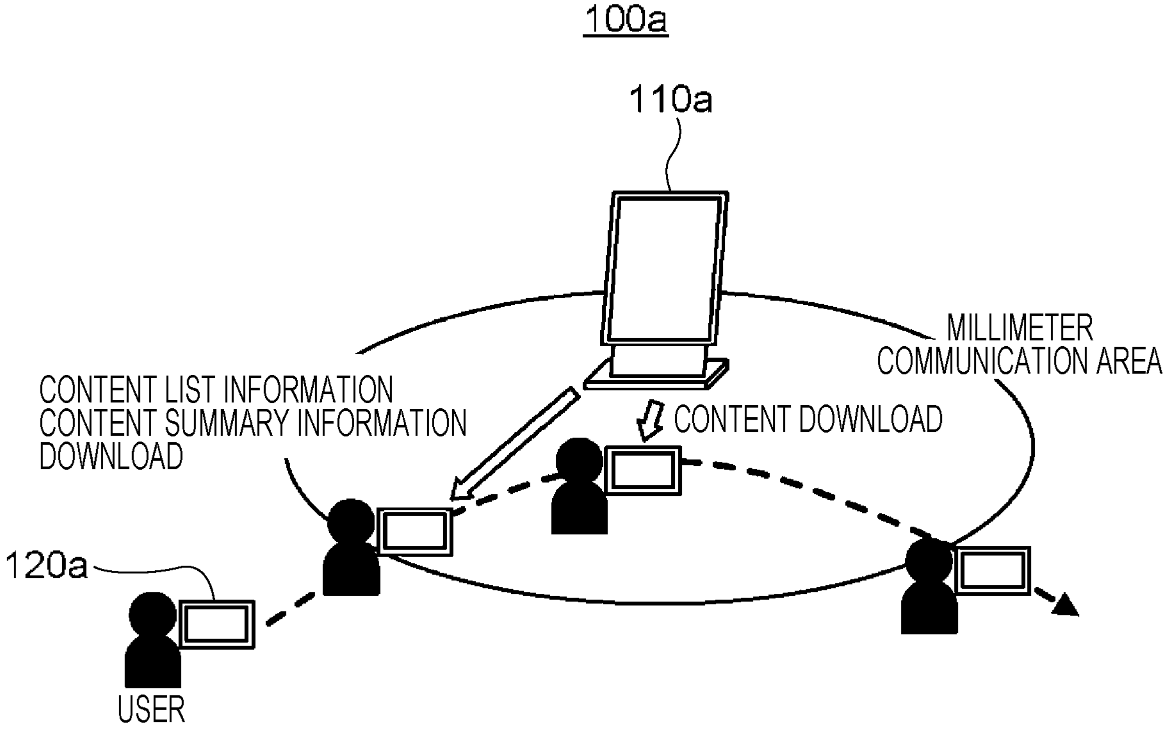
FIG. 2 is a diagram illustrating an overview of the content delivery system according to the first embodiment of the present disclosure.

The content delivery terminal 110*a* is placed at a predetermined location and performs millimeter wave wireless communication with the user terminals 120*a* that are present in a millimeter-wave communication area (a local cell) in FIG. 2.

When each user terminal 120*a* has not yet downloaded content list information and content summary information at the timing of entering the millimeter-wave communication area of the content delivery terminal 110*a* or at the timing of starting using a content delivery service in response to a user operation in the millimeter-wave communication area, the user terminal 120*a* connects with the content delivery terminal 110*a* and downloads the content list information and the content summary information from the content delivery terminal 110*a*. After completing the download of the content list information and the content summary information, the user terminal 120*a* disconnects the connection with the content delivery terminal 110*a*.

Also, at a timing when a user in the millimeter-wave communication area of the content delivery terminal 110*a* selects content to be played and displayed, the user terminal 120*a* connects with the content delivery terminal 110*a* and downloads the content from the content delivery terminal 110*a* at a timing when the user gives a request for downloading the content. After completing the download of the content, the user terminal 120*a* disconnects the connection with the content delivery terminal 110*a*.

At a timing when the user terminal 120*a* moves out of the millimeter-wave communication area while being connected with the content delivery terminal 110*a*, the user terminal 120*a* also disconnects the connection with the content delivery terminal 110*a*.

<Configuration of Content Delivery Terminal>

Figure 3:
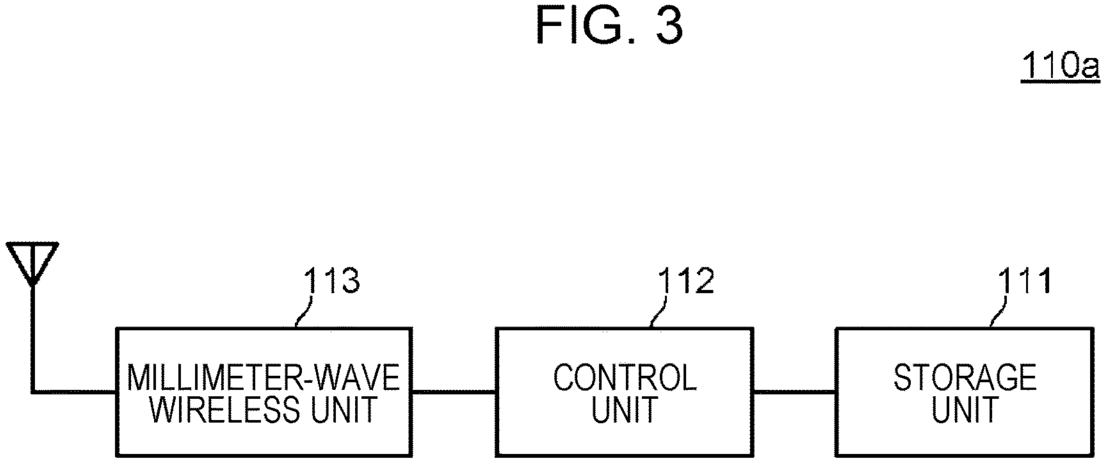
FIG. 3 is a block diagram of the content delivery terminal according to the first embodiment of the present disclosure.

Next, the configuration of the content delivery terminal 110*a* according to the present embodiment will be described with reference to FIG. 3. As illustrated in FIG. 3, the content delivery terminal 110*a* includes a storage unit 111, a control unit 112, and a millimeter-wave wireless unit 113.

The storage unit 111 stores, for example, content list information, content summary information, and content.

In response to a download request signal transmitted from the user terminal 120*a* and input via the millimeter-wave wireless unit 113, the control unit 112 transmits the content list information, the content summary information, and the content stored in the storage unit 111 to the user terminal 120*a* via the millimeter-wave wireless unit 113.

The millimeter-wave wireless unit 113 performs predetermined wireless reception processing, such as downsampling and amplification, on signals received from the user terminal 120*a* over a millimeter wave band (for example, a 60 GHz band) and outputs resulting signals to the control unit 112. The millimeter-wave wireless unit 113 also performs predetermined wireless transmission processing, such as upsampling and amplification, on information output from the control unit 112 and transmits resulting information to the user terminal 120*a* via an antenna over a millimeter wave band.

The content delivery terminal 110*a* may have a plurality of millimeter-wave wireless units 113. In this case, the content delivery terminal 110*a* can select and connect to the optimum millimeter-wave wireless unit 113 for each user terminal 120*a*.

The content delivery terminal 110*a* may also include a display unit. In this case, the content delivery terminal 110*a* can display a content list, thumbnails, an introduction moving image, and so on.

The content delivery terminal 110*a* may also include an operation unit. In this case, the user can choose content with the content delivery terminal 110*a* for trial listening/viewing.

<User Terminal>

Figure 4:
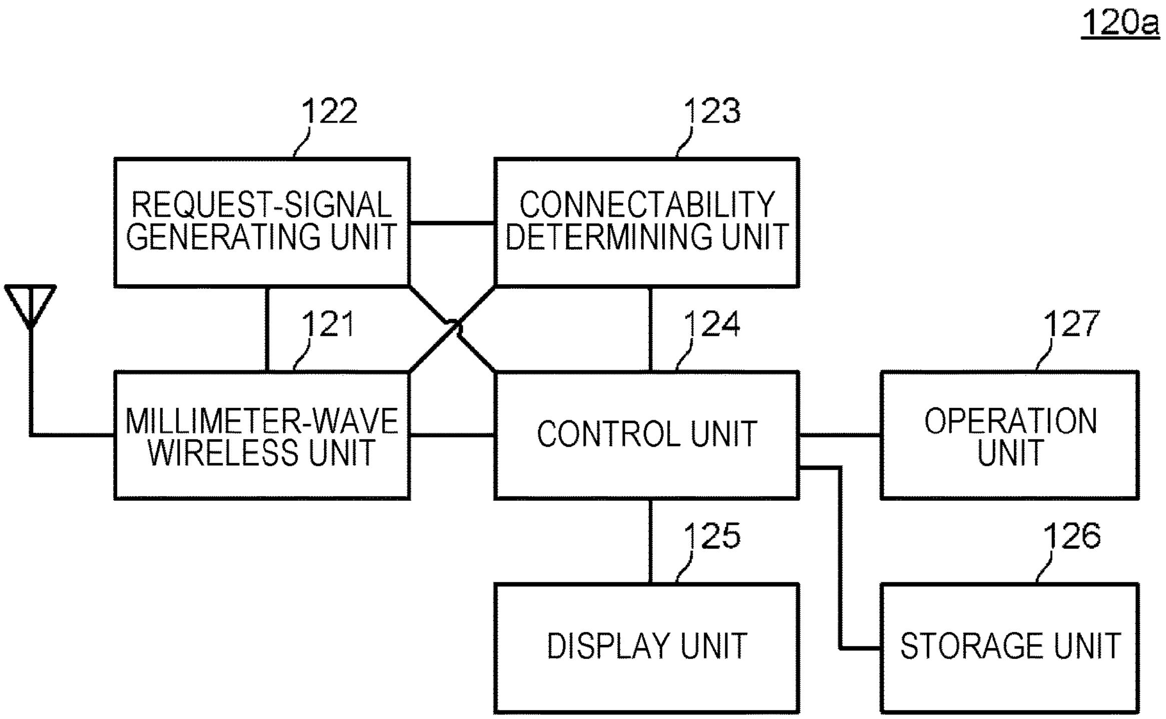
FIG. 4 is a block diagram of a user terminal according to the first embodiment of the present disclosure.

Next, the configuration of each user terminal 120*a* according to the present embodiment will be described with reference to FIG. 4. As illustrated in FIG. 4, the user terminal 120*a* includes a millimeter-wave wireless unit 121, a request-signal generating unit 122, a connectability determining unit 123, a control unit 124, a display unit 125, a storage unit 126, and an operation unit 127.

The millimeter-wave wireless unit 121 performs predetermined wireless transmission processing, such as upsampling and amplification, on various request signals output from the request-signal generating unit 122 and transmits resulting signals to the content delivery terminal 110*a* via an antenna over a millimeter wave band (for example, a 60 GHz band). Also, the millimeter-wave wireless unit 121 performs predetermined wireless reception processing, such as downsampling and amplification, on information received from the content delivery terminal 110*a* over a millimeter wave and outputs resulting information to the control unit 124.

The request-signal generating unit 122 generates various request signals in accordance with instructions from the control unit 124 and transmits the request signals to the content delivery terminal 110*a* via the millimeter-wave wireless unit 121. The request signals include, for example, at least one of a connection request signal for requesting connection with the content delivery terminal 110*a*, a disconnection request signal for requesting disconnection from the content delivery terminal 110*a* that is connected, and a download request signal for issuing a request for downloading information, such as content, to the content delivery terminal 110*a*.

The connectability determining unit 123 determines whether or not the user terminal 120*a* is present in the millimeter-wave communication area of the content delivery terminal 110*a*, that is, the user terminal 120*a* is in a state in which it can connect with the content delivery terminal 110*a*. For example, when a beacon transmitted from the content delivery terminal 110*a* is received via the millimeter-wave wireless unit 121, or when a beacon is received via the millimeter-wave wireless unit 121 and the reception power of the received beacon is larger than or equal to a predetermined threshold, the connectability determining unit 123 determines that the user terminal 120*a* enters the millimeter-wave communication area and enters a state in which it can connect with the content delivery terminal 110*a*. The connectability determining unit 123 then outputs, to the control unit 124, connectability information indicating that the connection with the content delivery terminal 110*a* is enabled/disabled.

Based on the connectability information from the connectability determining unit 123 or operational information from the operation unit 127, the control unit 124 issues an instruction for generating various request signals to the request-signal generating unit 122. Also, the control unit 124 stores, in the storage unit 126, for example, content list information, content summary information, and content downloaded from the content delivery terminal 110*a* via the millimeter-wave wireless unit 121. Also, based on operational information from the operation unit 127, the control unit 124 outputs at least one of the content list information, the content summary information, and the content stored in the storage unit 126 to the display unit 125.

Figure 5:
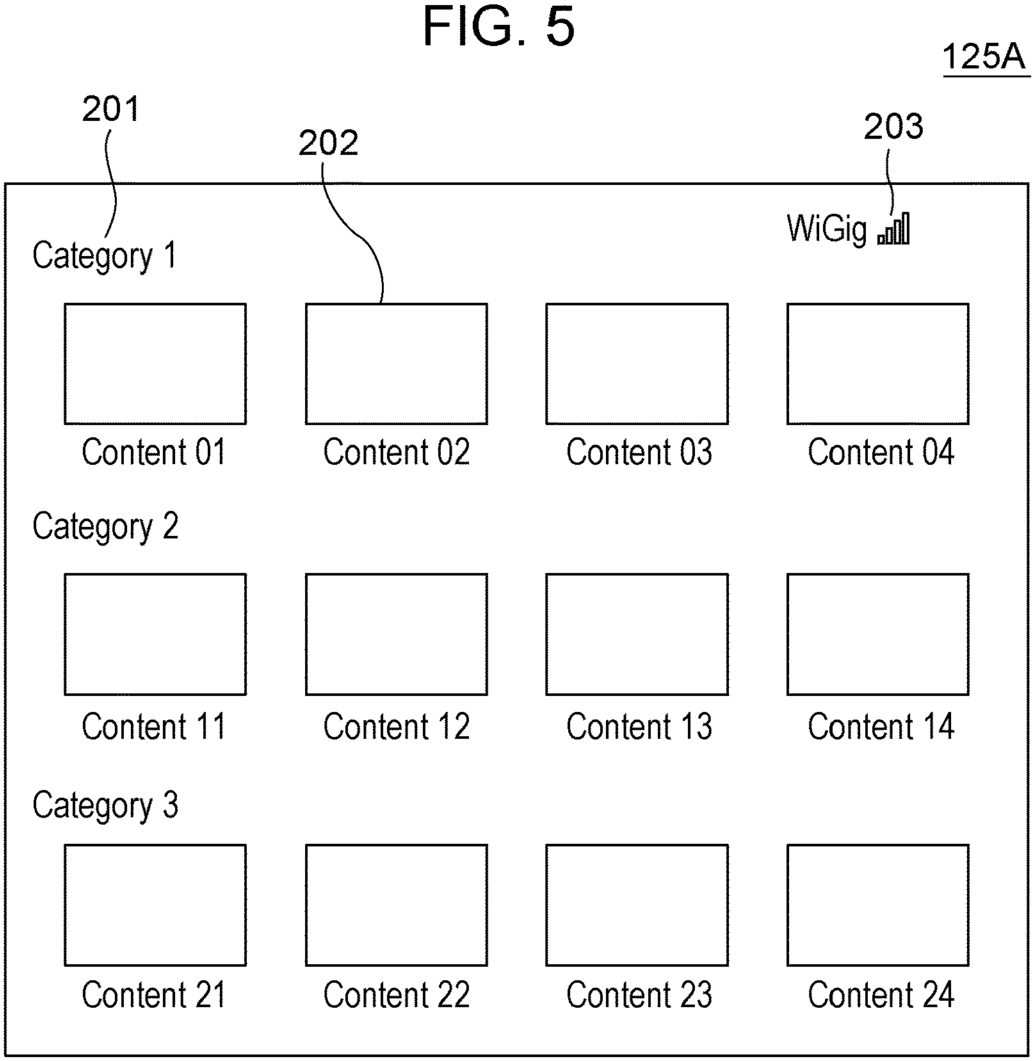
FIG. 5 is a view illustrating a display example of content list information according to the first embodiment of the present disclosure.

The display unit 125 displays the information, output from the control unit 124, on a screen 125A (see FIG. 5 and so on).

The storage unit 126 stores the content list information, the content summary information, the content, and so on output from the control unit 124. For example, for the user terminal 120*a* for which content to be downloaded is predetermined, such as a tablet computer for introducing exhibits at a gallery or a tablet computer for learning at a school, the content list information and the content summary information may be pre-stored in the storage unit 126.

The operation unit 127 outputs various types of operational information indicating details of operations of the user to the control unit 124.

<Display of Content List>

Next, a display example of a content list will be described with reference to FIG. 5.

When the user terminal 120*a* is in a state it can connect with the content delivery terminal 110*a* or starts using the content delivery service, the control unit 124 outputs the content list information to the display unit 125. The display unit 125 displays, on the screen 125A, a content list including thumbnails (reduced-size images) 202 of pieces of content sorted according to categories 201. While the content list is displayed on the screen 125A, the user terminal 120*a* does not have to be connected with the content delivery terminal 110*a*.

Figure 6:
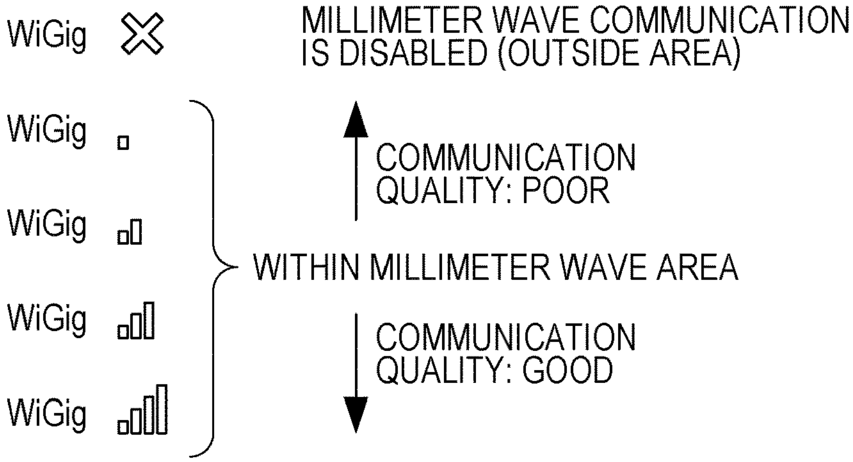
FIG. 6 is a view illustrating a first example of display of a communication state according to the first embodiment of the present disclosure.
Figure 7:
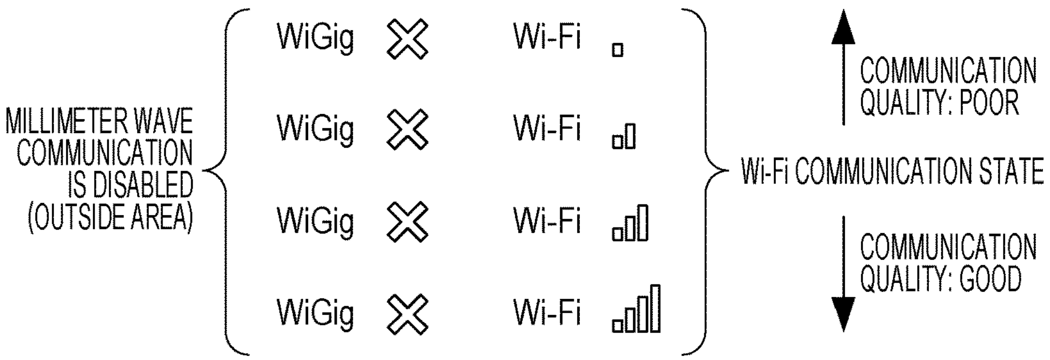
FIG. 7 is a view illustrating a second example of the display of the communication state according to the first embodiment of the present disclosure.

Also, the display unit 125 displays, at the upper right of the screen 125A, an environment icon 203 indicating a communication environment of millimeter wave communication (WiGig). FIG. 6 is a view illustrating one example of a display pattern of the environment icon 203. As illustrated in FIG. 6, when the user terminal 120*a* is outside the millimeter-wave communication area of the content delivery terminal 110*a* and is in an environment where it is difficult to perform millimeter wave communication with the content delivery terminal 110*a*, the display unit 125 displays the environment icon 203 indicating mark "X" on the screen 125A. Also, when the user terminal 120*a* is within the millimeter-wave communication area of the content delivery terminal 110*a*, the display unit 125 displays, on the screen 125A, the environment icon 203 corresponding to the state of the communication quality of the millimeter wave communication, as illustrated in FIG. 7.

Although whether the communication is enabled or disabled and whether the user terminal 120*a* is within or outside the area are denoted using the number of antennas and mark "x" in the above description, they may be other notations. Also, when direction information of a beam from the antenna can be obtained, this may also be shown together. This allows the user terminal 120*a* to make the user recognize the beam direction of millimeter wave communication.

Figure 8:
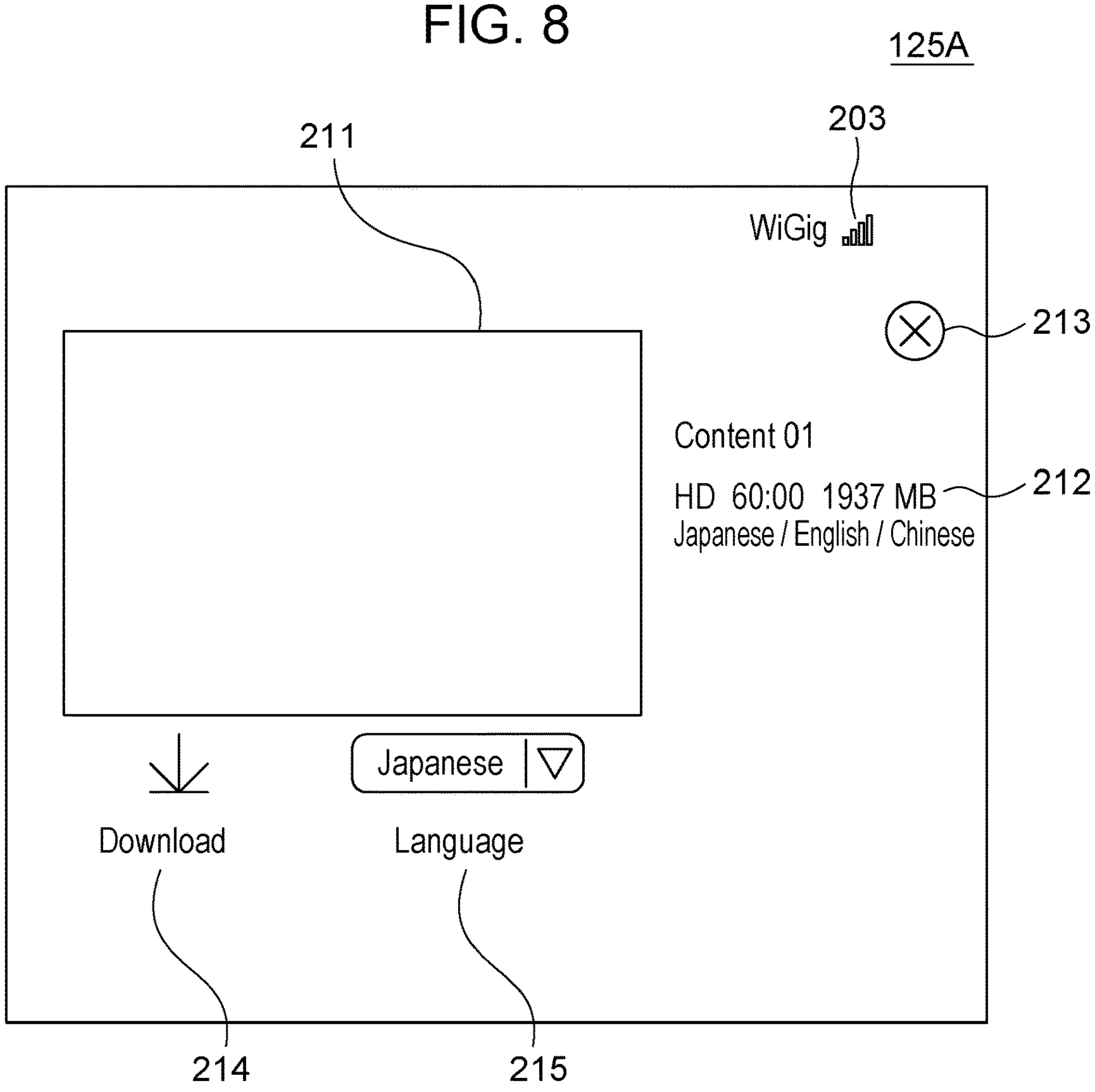
FIG. 8 is a view illustrating a display example (undownloaded content) of content summary information according to the first embodiment of the present disclosure.
Figure 10:
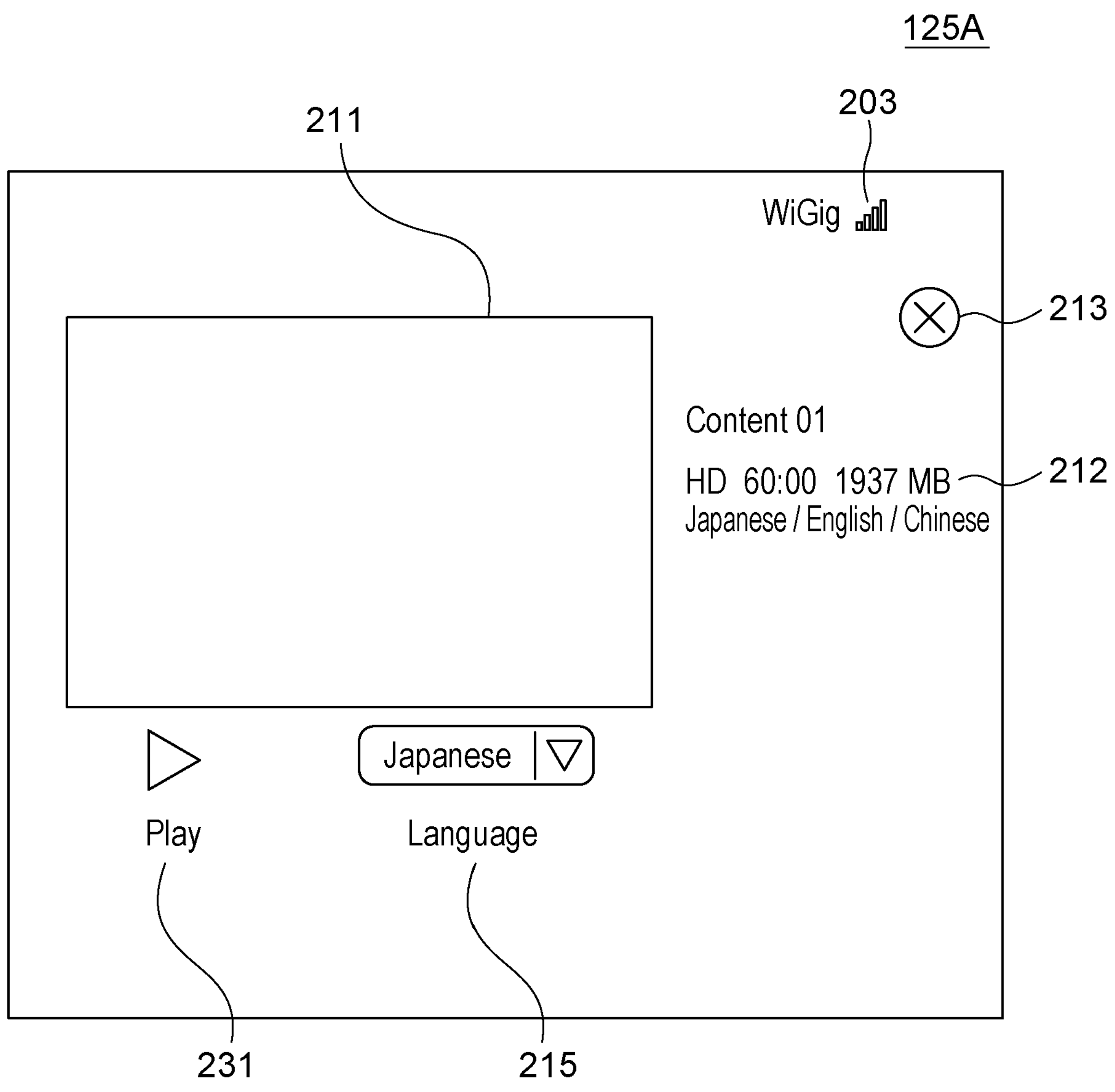
FIG. 10 is a view illustrating a display example (downloaded content) of the content summary information according to the first embodiment of the present disclosure.

After the user performs an operation of selecting one piece of content on the content-list display screen illustrated in FIG. 5, the screen switches to a content-summary display screen illustrated in FIG. 8 or 10.

<Display of Content Summary>

Figure 9:
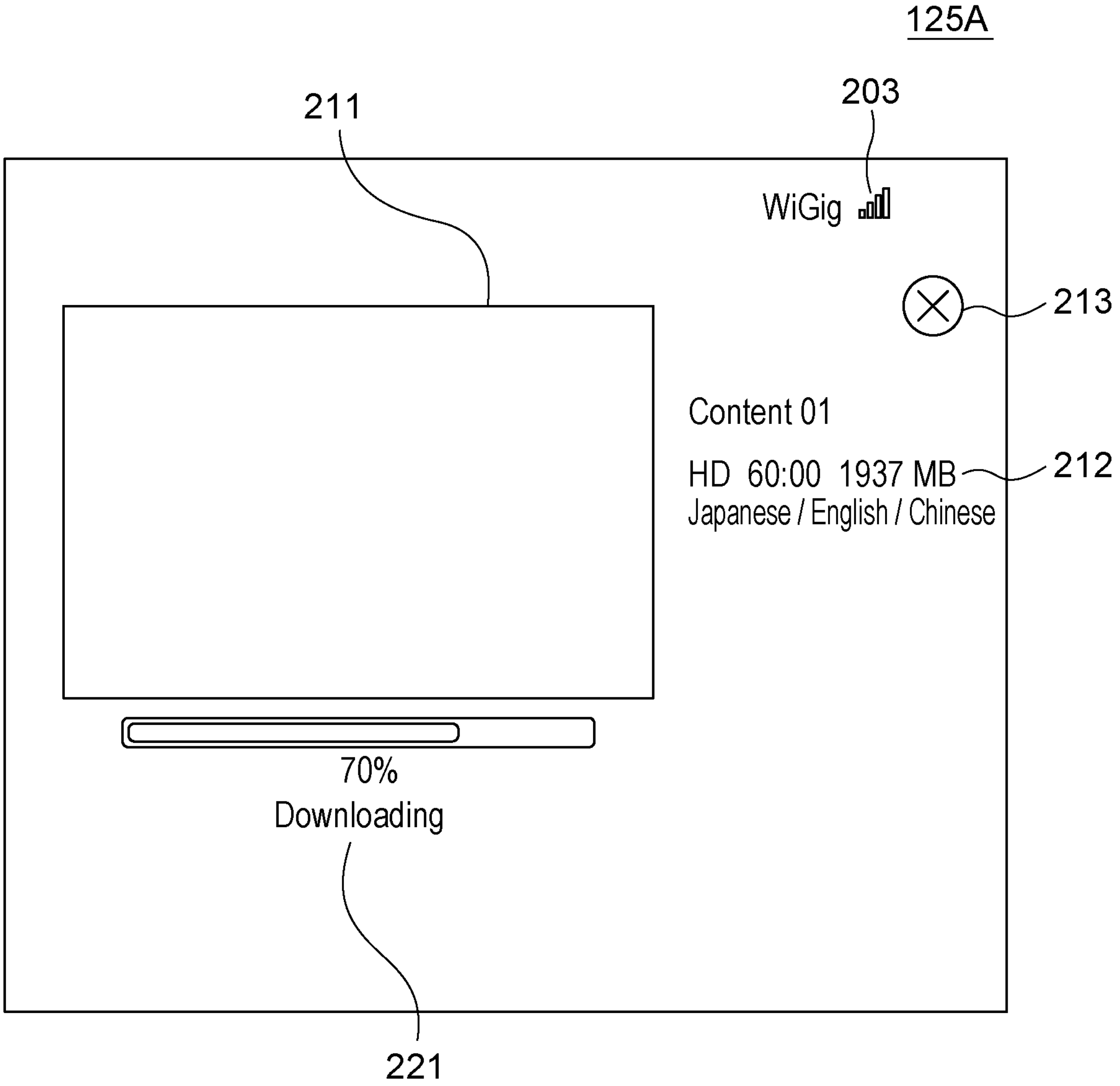
FIG. 9 is a view illustrating a display example (during download) of the content summary information according to the first embodiment of the present disclosure.

Next, a display example of the content summary will be described with reference to FIGS. 8, 9, and 10. FIG. 8 illustrates a content-summary display screen indicating that the selected content is content that has not yet been downloaded. FIG. 9 illustrates a content-summary display screen indicating that the undownloaded content is being downloaded. FIG. 10 is a content-summary display screen indicating that the selected content is already-downloaded content.

After the user performs an operation of selecting one piece of content on the content-list display screen illustrated in FIG. 5, the control unit 124 outputs content summary information of the selected content to the display unit 125. The display unit 125 displays, on the screen 125A, a content summary including a thumbnail 211 of the content and a description 212 of the content. The description 212 of the content includes, for example, a title, a resolution, a play total time, a file size, and supported languages. When unloaded-content summary information is displayed on the screen 125A, the user terminal 120*a* starts a process for connecting with the content delivery terminal 110*a*.

Also, the display unit 125 displays, at the upper right of the screen 125A, the environment icon 203 indicating the communication environment of the millimeter wave communication (WiGig) (see FIG. 6).

Also, the display unit 125 displays, on the screen 125A, a back icon 213 in the vicinity of the environment icon 203. After the user performs an operation of selecting the back icon 213, the screen 125A switches to the content-list display screen illustrated in FIG. 5. When a connection is already established over millimeter wave communication in FIGS. 8 to 10, the user terminal 120*a* disconnects the connection with the content delivery terminal 110*a*.

When the selected content is undownloaded content, and the connection is established over millimeter wave communication, the display unit 125 displays a download start icon 214, which prompts the user to perform downloading, and a language selection icon 215 on the screen 125A, as illustrated in FIG. 8. After the user performs an operation of selecting the download start icon 214, the screen 125A switches to a display screen illustrated in FIG. 9, and the user terminal 120*a* starts download of the undownloaded content from the content delivery terminal 110*a*.

During the download, the display unit 125 displays a download progress bar 221 indicating a progress of the download on the screen 125A, as illustrated in FIG. 9, instead of the download start icon 214 and the language selection icon 215. After the download is completed, the screen 125A switches to the display screen illustrated in FIG. 10, and the user terminal 120*a* disconnects the connection with the content delivery terminal 110*a*.

When the selected content is downloaded content, or when the download of the undownloaded content is completed, the display unit 125 displays a play icon 231 for prompting the user to play the content on the screen 125A, as illustrated in FIG. 10, instead of the download start icon 214. After the user performs an operation of selecting the play icon 231, the screen 125A switches to a display screen (illustrated in FIG. 11) indicating that the content is being played.

<Play and Display of Content>

Next, a display example when playing content will be described with reference to FIG. 11.

Figure 11:
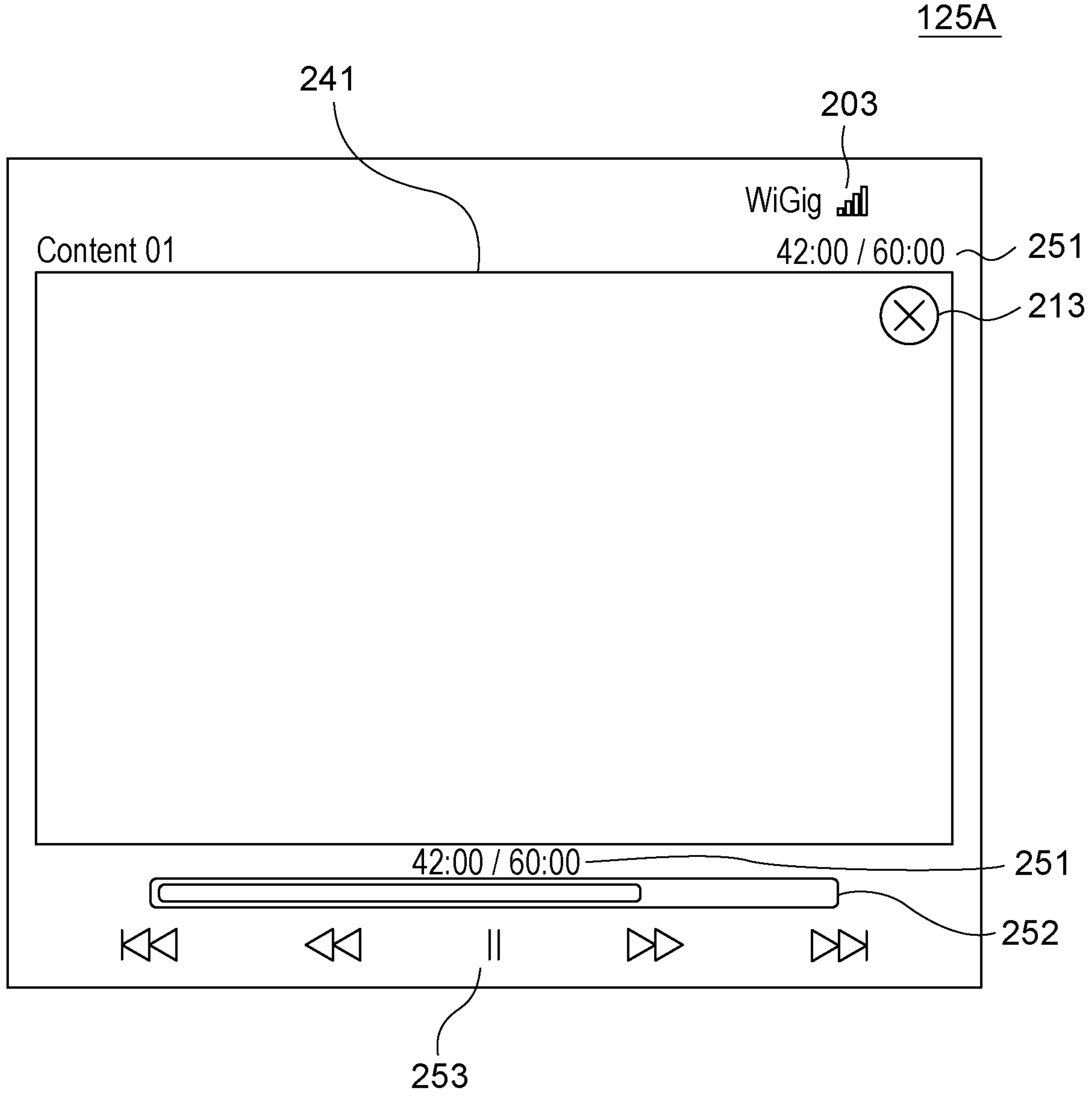
FIG. 11 is a view illustrating a display example of play of content according to the first embodiment of the present disclosure.

After the user performs an operation of selecting the play icon 231 on the downloaded-content-summary display screen illustrated in FIG. 11, the control unit 124 outputs information of the selected content to the display unit 125. The display unit 125 plays and displays the content in a play frame 241 on the screen 125A.

Also, the display unit 125 displays, at the upper right of the screen 125A, the environment icon 203 indicating the communication environment of the millimeter wave communication (WiGig) (see FIG. 6).

Also, the display unit 125 displays, on the screen 125A, the back icon 213 adjacent to the environment icon 203. After the user performs an operation of selecting the back icon 213, the screen 125A switches to the downloaded-content-summary display screen illustrated in FIG. 10.

Also, in FIG. 11, the display unit 125 may display, on the screen 125A, play progress information 251 (two parts) indicating the progress of the play and a play total time, a play progress bar 252 indicating the progress of the play, and play control icons 253.

When no operation is performed for a certain period of time during play of the content, the display of the above-described icons and so on is deleted, and when the user performs an operation, they may be displayed again. This makes it possible to omit display of non-content, so that the user can concentrate on the content viewing/listening.

<Processing Flow of User Terminal>

Figure 12:
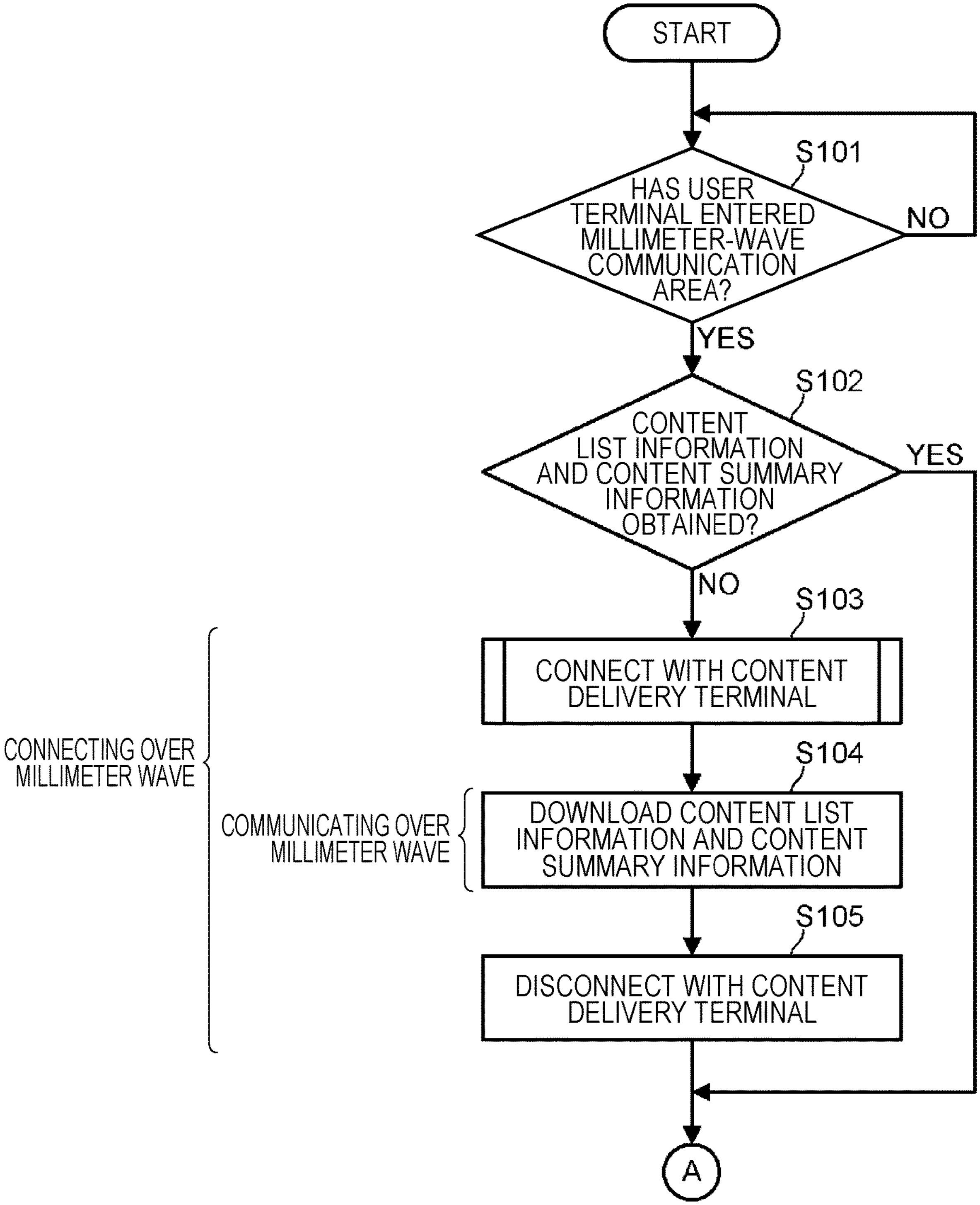
FIG. 12 is a flow diagram illustrating a processing procedure of the user terminal according to the first embodiment of the present disclosure.
Figure 13:
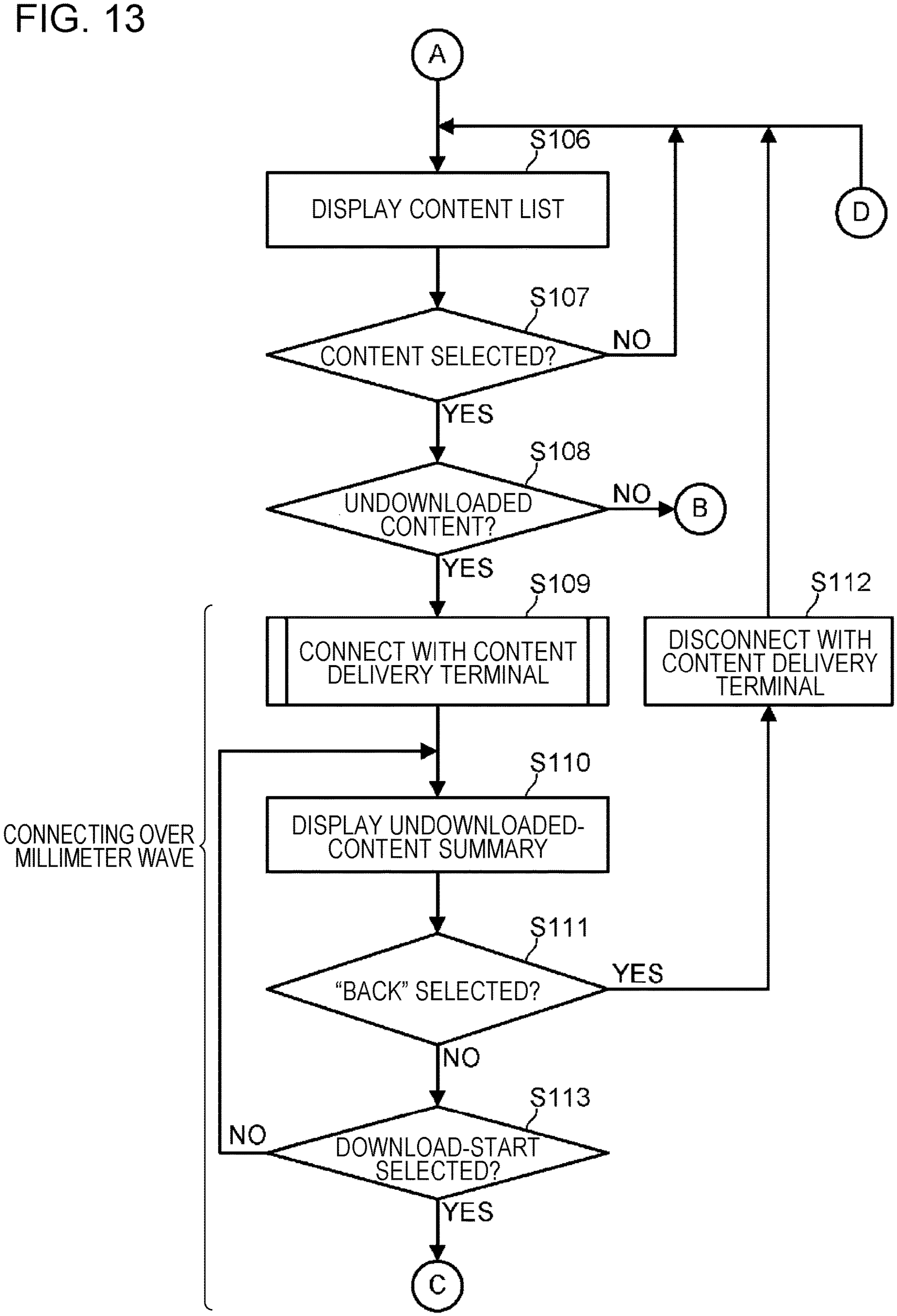
FIG. 13 is a flow diagram illustrating a processing procedure of the user terminal according to the first embodiment of the present disclosure.
Figure 14:
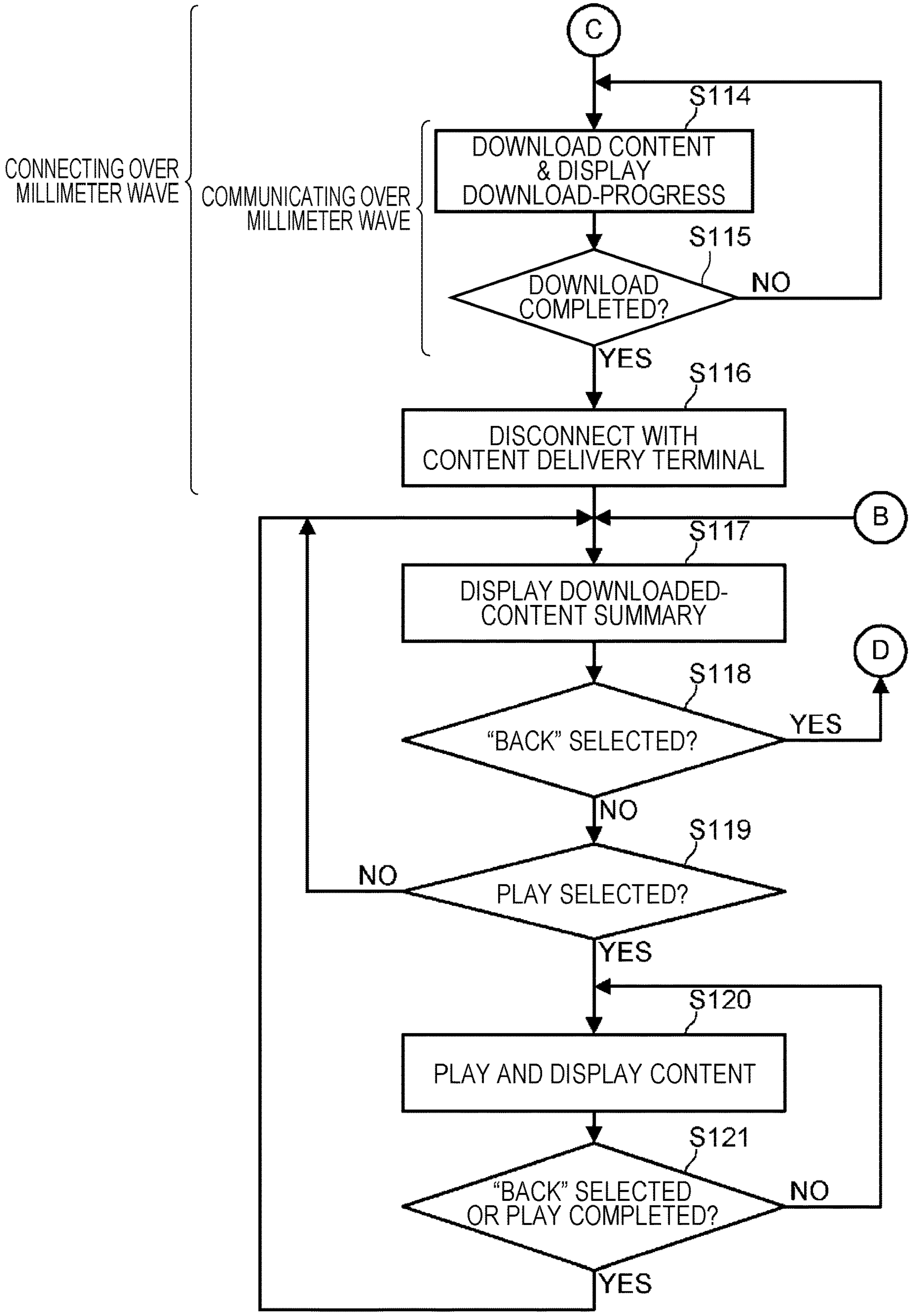
FIG. 14 is a flow diagram illustrating the processing procedure of the user terminal according to the first embodiment of the present disclosure.

Next, a processing flow of the user terminal 120*a* according to the present embodiment will be described with reference to FIGS. 12 to 14. As a premise, the content delivery terminal 110*a* is assumed to cyclically transmit a beacon.

In S101, the connectability determining unit 123 in the user terminal 120*a* determines whether or not it has entered the communication area of the content delivery terminal

110*a* in accordance with whether or not a beacon from the content delivery terminal 110*a* is received or through comparison of the reception power of a beacon received from the content delivery terminal 110*a* with a threshold.

When the user terminal 120*a* has not entered the communication area (S101: NO), the flow returns to S101. After a certain amount of time passes, the user terminal 120*a* re-determines whether or not it has entered the communication area.

When the user terminal 120*a* enters the communication area of the content delivery terminal 110*a* (S101: YES), in S102, the control unit 124 refers to the storage unit 126 to determine whether or not content list information and content summary information have been obtained.

When the content list information and the content summary information have been obtained (S102: YES), the flow proceeds to S106.

When the content list information and the content summary information have not been obtained (S102: NO), the user terminal 120*a* performs a process for connecting with the content delivery terminal 110*a* in S103. Details of the connection process are described later.

Next, in S104, the request-signal generating unit 122 transmits a download request signal for the content list information and the content summary information to the content delivery terminal 110*a* via the millimeter-wave wireless unit 121. The control unit 124 downloads the content list information and the content summary information from the content delivery terminal 110*a* via the millimeter-wave wireless unit 121 and stores the information in the storage unit 126.

After the download is completed, in S105, the request-signal generating unit 122 transmits a disconnection request signal to the content delivery terminal 110*a* via the millimeter-wave wireless unit 121 to disconnect the connection with the content delivery terminal 110*a*. Since the amounts of the content list information and the content summary information are small compared with the content, the processes from S103 to S105 are completed in a short time.

In the case of YES in S102, or in S106, which is a next step of S105, the control unit 124 outputs the content list information stored in the storage unit 126 to the display unit 125 to cause a content list to be displayed on the screen 125A (see FIG. 5).

Also, in parallel with the processes in and after S106, the connectability determining unit 123 cyclically determines whether or not the user terminal 120*a* has entered the communication area of the content delivery terminal 110*a*. The communication quality may also be determined from the reception power of a received beacon, other than the connectability.

Next, in S107, based on operational information from the operation unit 127, the control unit 124 determines whether or not the content displayed in the list has been selected.

When any of the pieces of content displayed in the list has not been selected (S107: NO), the flow returns to S106.

When one of the pieces of content displayed in the list is selected (S107: YES), in S108, the control unit 124 determines whether or not the selected content is undownloaded content, based on the operational information from the operation unit 127 and information of the content stored in the storage unit 126.

When the selected content is downloaded content (S108: NO), the flow proceeds to S117.

On the other hand, when the selected content is undownloaded content (S108: YES), S109, the user terminal 120*a* starts a process for connecting with the content delivery terminal 110*a*, as in S103. The flow from S106 to S113 may be executed without waiting for completion of the connection process in S109.

Next, in S110, the control unit 124 outputs the content summary information of the undownloaded content stored in the storage unit 126 to the display unit 125 to cause a content summary to be displayed on the screen 125A (see FIG. 8).

Next, in S111, the control unit 124 determines whether or not the user has selected "back" to the content list, based on the user's operational information obtained via the operation unit 127.

When the user selects "back" (S111: YES), in S112, the request-signal generating unit 122 transmits a disconnection request signal to the content delivery terminal 110*a* via the millimeter-wave wireless unit 121 to disconnect the connection with the content delivery terminal 110*a*. The flow returns to S106.

On the other hand, when the user does not select "back" (S111: NO), in S113, the control unit 124 determines whether or not the user has selected the start of download of the content, based on the operational information from the operation unit 127.

When the start of the download is not selected (S113: NO), the flow returns to S110.

On the other hand, when the start of the download is selected (S113: YES), in S114, the request-signal generating unit 122 transmits, via the millimeter-wave wireless unit 121, a download request signal for the content to the content delivery terminal 110*a* that is connected. The control unit 124 starts the download of the content from the content delivery terminal 110*a* via the millimeter-wave wireless unit 121. At this point, the display unit 125 displays the progress of the download on the screen 125A (see FIG. 9).

When the connection process between the content delivery terminal 110*a* and the user terminal 120*a* is not completed in S113, the color of the download start icon 214 in FIG. 8 may be changed to a color (for example, gray) different from those of the other icons to notify the user that the download is being prepared. Alternatively, for example, the environment icon 203 indicating the communication environment of the millimeter wave communication may be blinked or the color of the environment icon 203 may be changed to a color (for example, gray) different from those of the other icons to notify the user that the connection process is being performed.

Next, in S115, the control unit 124 determines whether or not the download of the content is completed.

When the download of the content is not completed (S115: NO), the flow returns to S114, and the download is continued.

On the other hand, when the download of the content is completed (S115: YES), in S116, the request-signal generating unit 122 transmits a disconnection request signal to the content delivery terminal 110*a* via the millimeter-wave wireless unit 121 to disconnect the connection with the content delivery terminal 110*a*. Also, the control unit 124 stores, in the storage unit 126, the content whose download is completed.

In the case of NO in S108, or in S117, which is a next step of S116, the control unit 124 outputs the content summary information of the downloaded content stored in the storage unit 126 to the display unit 125 to cause a content summary to be displayed on the screen 125A (see FIG. 10).

Next, in S118, the control unit 124 determines whether or not the user has selected "back" to the content list.

When the user selects "back" (S118: YES), the flow returns to S106.

On the other hand, when the user has not selected "back" (S118: NO), in S119, the control unit 124 determines whether or not the user has selected the play of the content, based on operational information from the operation unit 127.

When the play of the content is not selected (S119: NO), the flow returns to S117.

On the other hand, when the play of the content is selected (S119: YES), in S120, the control unit 124 outputs information of the content stored in the storage unit 126 to the display unit 125 to cause the content to be played and displayed on the screen 125A (see FIG. 11).

Next, in S121, the control unit 124 determines whether or not the user has selected "back" or whether or not the play of the content is completed.

When the user has not selected "back", and the play of the content is not completed (S121: NO), the flow returns to S120, and the play of the content is continued.

On the other hand, when the user selects "back", or the play of the content is completed (S121: YES), the flow returns to S117.

The above-described processing flow is continued, for example, until a power supply of the user terminal 120*a* is turned off or until the user requests stopping of provision of the content delivery service.

When a certain amount of time has passed without selection of the start of the download (S113: NO) after the content summary of the undownloaded content in the above-described processing flow is displayed (S111), in S112, the connection with the content delivery terminal 110*a* may be disconnected, and the flow may return to S106. In this case, it is possible to prevent unwanted link occupation. In this case, at a point when the user starts the download, the connection process is executed again. Alternatively, when the user selects "back", the flows returns to S106.

The flow in processes in and after S106 can be executed even when the user terminal 120*a* is outside the millimeter-wave communication area. In this case, when the user terminal 120*a* is outside the millimeter-wave communication area, in S109, the user terminal 120*a* may notify the user that the user terminal 120*a* is outside the millimeter-wave communication area and may wait for the user terminal 120*a* to be connected again when the user moves into the millimeter-wave communication area or may wait with the display screen of the undownloaded-content summary until the screen returns to content list through the back button. In this case, the user terminal 120*a*, for example, changes the color of the download button to a color (for example, gray) different from its general color or displays that the user terminal 120*a* is outside the area of millimeter wave communication by using the environment icon 203 to notify that the download is not possible.

<Detailed Flow of Connection Process>

Figure 15:
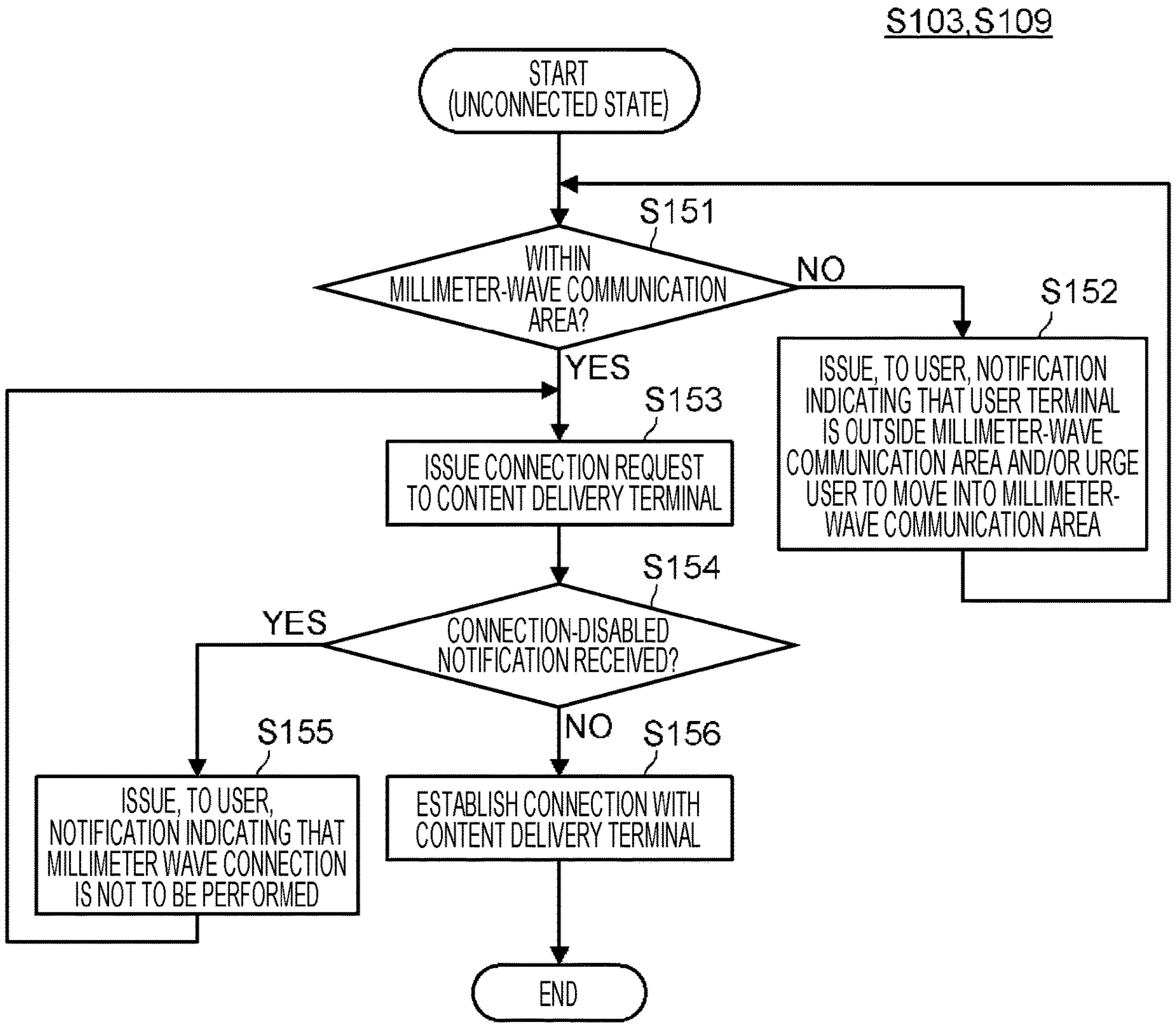
FIG. 15 is a flow diagram illustrating a detailed procedure of a connection process of the user terminal according to the first embodiment of the present disclosure.

Next, a detailed flow of the connection processes in S103 and S109 described above in FIGS. 12 and 13 will be described with reference to FIG. 15.

In S151, the connectability determining unit 123 in the user terminal 120*a* determines whether or not the user terminal 120*a* is within the millimeter-wave communication area of the content delivery terminal 110*a*.

When the user terminal 120*a* is outside the millimeter-wave communication area of the content delivery terminal 110*a* (S151: NO), in S152, the user terminal 120*a* notifies the user that it is outside the millimeter-wave communication area and/or notifies the user of a message for urging moving to the millimeter-wave communication area. The flow returns to S151.

When the user terminal 120*a* is within the millimeter-wave communication area of the content delivery terminal 110*a* (S151: YES), in S153, the request-signal generating unit 122 in the user terminal 120*a* transmits a connection request signal to the content delivery terminal 110*a* via the millimeter-wave wireless unit 121.

Upon receiving a notification indicating the connection is disabled from the content delivery terminal 110*a* (S154: YES), in S155, the user terminal 120*a* notifies the user that the connection over millimeter wave communication is not to be performed. The flow returns to S153. The user terminal 120*a* may also notify the user so as to wait for the connection.

On the other hand, upon receiving a notification indicating that the communication is enabled from the content delivery terminal 110*a* (S154: NO), the user terminal 120*a* establishes the connection with the content delivery terminal 110*a* in S156 and ends the connection process.

<Processing Flow of Content Delivery Terminal>

Figure 16:
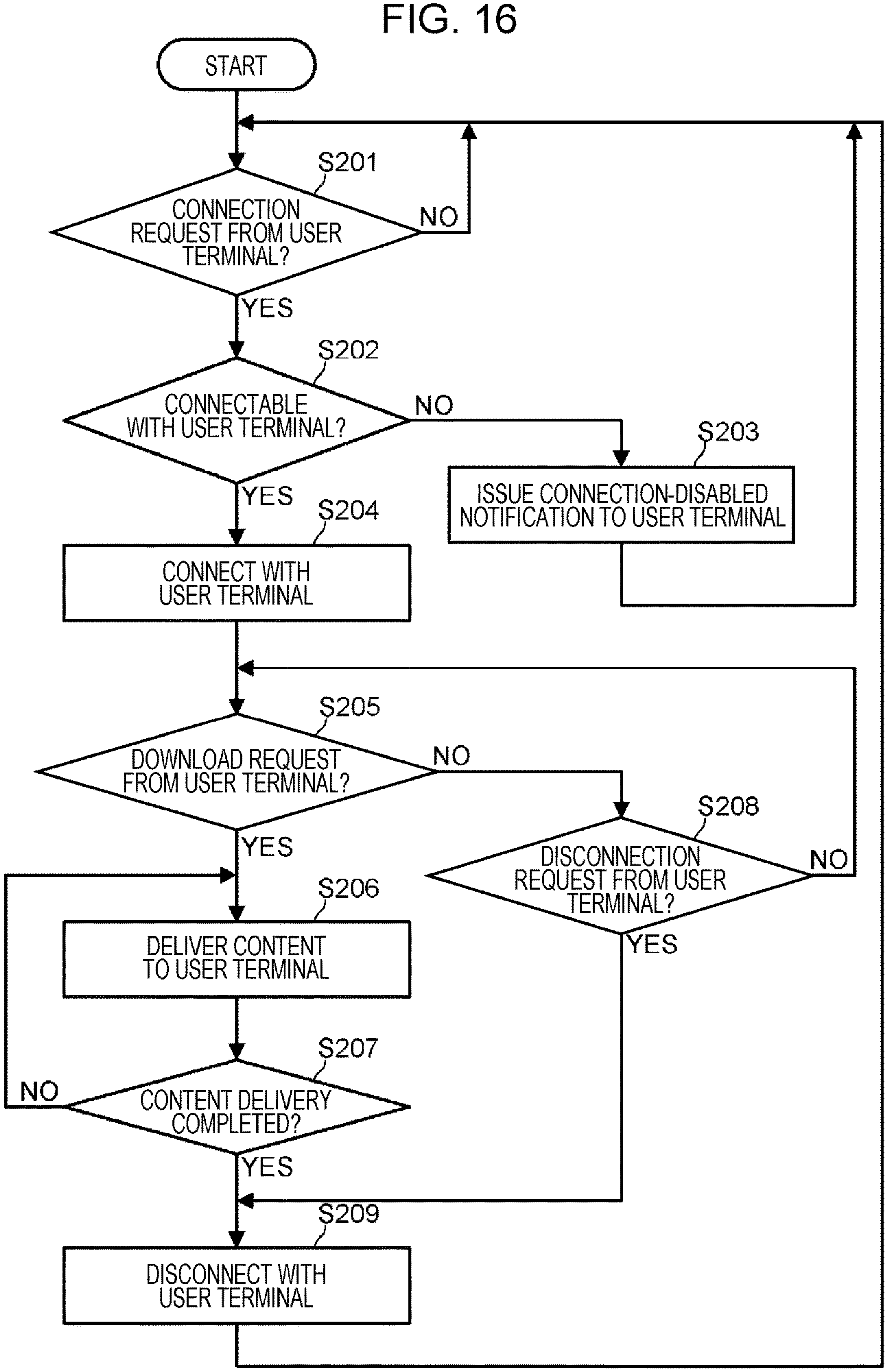
FIG. 16 is a diagram illustrating a processing procedure of the content delivery terminal according to the first embodiment of the present disclosure.

Next, a processing flow of the content delivery terminal 110*a* according to the present embodiment will be described with reference to FIG. 16.

In S201, the content delivery terminal 110*a* intermittently detects a connection request signal from the user terminal 120*a* (S201: NO).

Upon receiving a connection request signal (S201: YES), in S202, the content delivery terminal 110*a* determines whether or not connection with the user terminal 120*a* is enabled.

When the connection with the user terminal 120*a* is not to be performed (S202: NO), the content delivery terminal 110*a* issues a notification indicating that the connection is disabled to the user terminal 120*a* in S203. The flow returns to S201.

On the other hand, when the connection with the user terminal 120*a* is to be performed (S202: YES), the content delivery terminal 110*a* performs a process for connecting with the user terminal 120*a* in S204.

After connecting with the user terminal 120*a*, the content delivery terminal 110*a* intermittently detects a download request signal or a disconnection request signal from the user terminal 120*a* (S205: NO, S208: NO).

Upon receiving a download request signal for the content list information and the content summary information or the content from the user terminal 120*a* (S205: YES), in S206, the content delivery terminal 110*a* delivers, to the user terminal 120*a*, the content list information and the content summary information or the content specified by the download request signal.

When the delivery is completed (S207: YES) or when a disconnection request signal is received from the user terminal 120*a* (S205: NO, S208: YES), in S209, the content delivery terminal 110*a* disconnects the connection with the user terminal 120*a*. The flow returns to S201.

<Communication Sequence>

Figure 17:
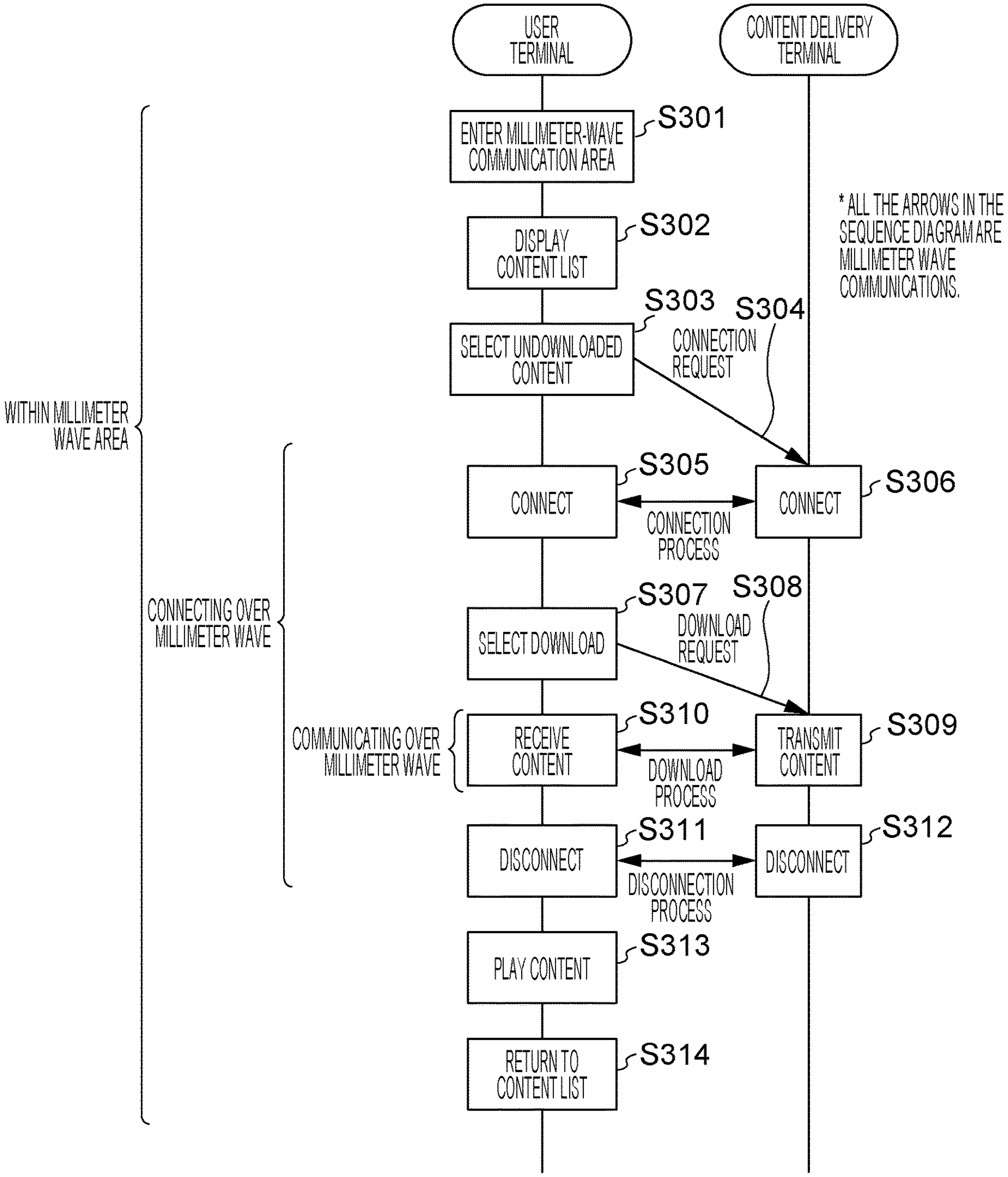
FIG. 17 is a sequence diagram illustrating a processing procedure when playing undownloaded content according to the first embodiment of the present disclosure.

Next, a communication sequence when playing undownloaded content, the communication sequence being executed between the content delivery terminal 110*a* and the user terminal 120*a* according to the present embodiment, will be described with reference to FIG. 17.

First, when the user terminal 120*a* enters the millimeter-wave communication area of the content delivery terminal 110*a* in S301, a content list is displayed in S302. When the user terminal 120*a* does not hold the content list information, the user terminal 120*a* transmits a connection request signal to the content delivery terminal 110*a* to perform a connection process to download the content list information and the content summary information from the content delivery terminal 110*a* and performs disconnection.

Next, when the user selects undownloaded content in S303, in S304, the user terminal 120*a* transmits a connection request signal to the content delivery terminal 110*a*, and the content delivery terminal 110*a* and the user terminal 120*a* perform a connection process in S305 and S306.

Next, when the user selects the download in S307, in S308, the user terminal 120*a* transmits a download request signal to the content delivery terminal 110*a*, and in S309 and S310, the content delivery terminal 110*a* and the user terminal 120*a* perform a download process. In the download process, the content delivery terminal 110*a* transmits content, and the user terminal 120*a* receives the content.

When the download process is completed, a disconnection process is performed between the content delivery terminal 110*a* and the user terminal 120*a* in S311 and S312. When the user selects play of the content, the user terminal 120*a* plays the content in S313.

After the play of the content is completed, the user terminal 120*a* displays the content list in S314.

<State Transition of User Terminal>

Figure 18:
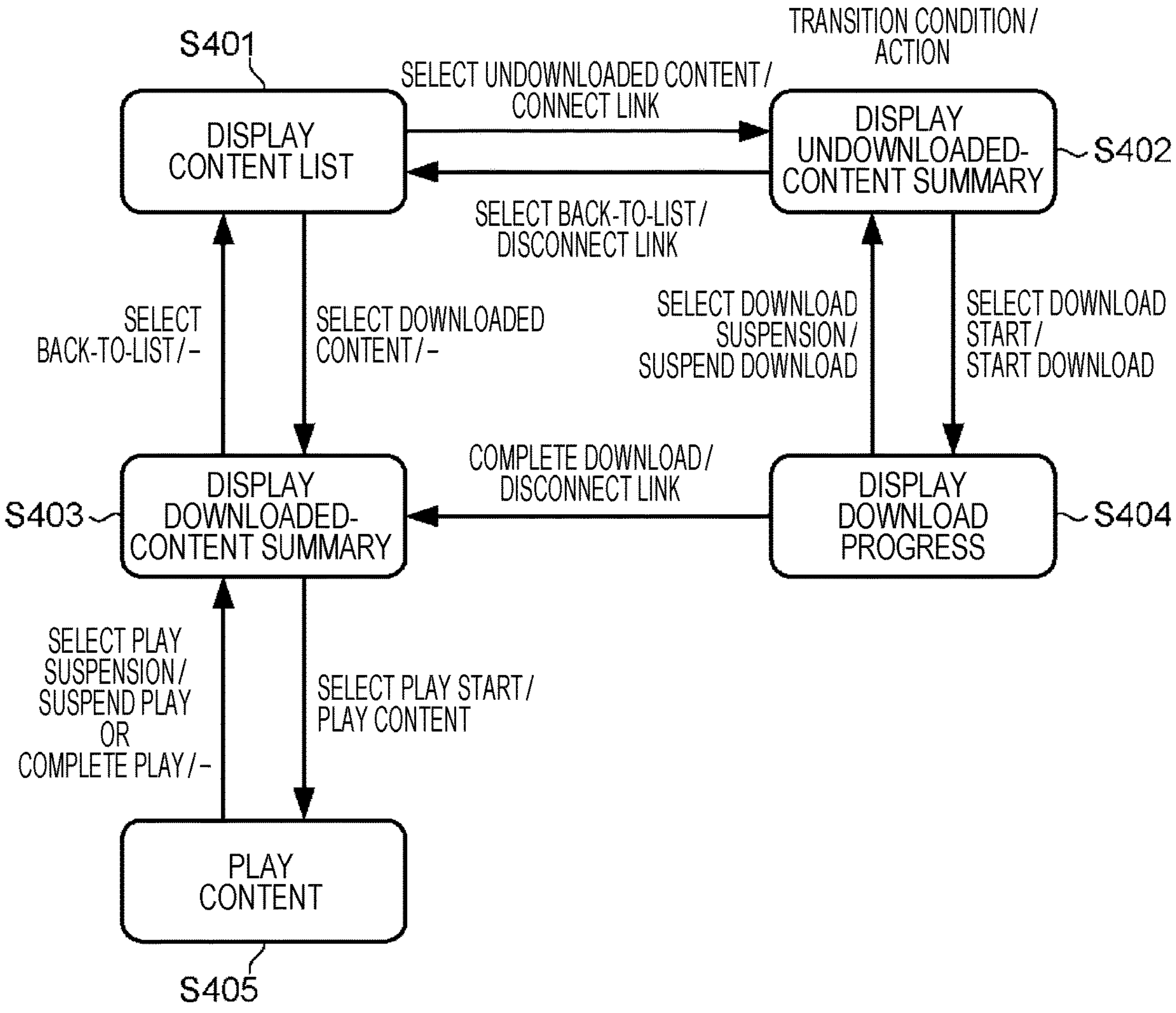
FIG. 18 is a state transition diagram illustrating transition of a display state of the user terminal according to the first embodiment of the present disclosure.

Next, transition of a display state of the user terminal 120*a* according to the present embodiment will be described with reference to FIG. 18.

After the user terminal 120*a* enters the millimeter-wave communication area of the content delivery terminal 110*a* or after starting using the content delivery service in response to a user operation in the millimeter-wave communication area, the user terminal 120*a* enters a content-list display state in which the content list is displayed (S401, see FIG. 5).

After the user selects undownloaded content in the content-list display state (S401), the user terminal 120*a* starts connecting with the content delivery terminal 110*a* and enters an undownloaded-content summary display state (S402, see FIG. 8) in which the summary of the undownloaded content is displayed.

Also, after the user selects downloaded content in the content-list display state (S401), the user terminal 120*a* enters a downloaded-content summary display state (S403, see FIG. 10) in which the summary of the downloaded content is displayed.

After the user selects "back" in the undownloaded-content summary display state (S402), the user terminal 120*a* disconnects the connection with the content delivery terminal 110*a* and enters the content-list display state (S401).

Also, after the user selects "Download" in the undownloaded-content summary display state (S402), the user terminal 120*a* starts download of the undownloaded content from the content delivery terminal 110*a* and enters a download-progress display state (S404, see FIG. 9) in which the progress of the download of the undownloaded content is displayed.

After the user selects "back" in the downloaded-content summary display state (S403), the user terminal 120*a* enters the content-list display state (S401).

Also, after the user selects "play" in the downloaded-content summary display state (S403), the user terminal 120*a* enters a content play state in which the content is played and displayed (S405, see FIG. 11).

After the user selects "back" in the middle of the download of the download-progress display state (S404), the user terminal 120*a* suspends the download and enters the undownloaded-content summary display state (S402).

After the download is completed in the download-progress display state (S404), the user terminal 120*a* disconnects the connection with the content delivery terminal 110*a* and enters the downloaded-content summary display state (S403).

After the user selects "back" in the middle of the play in the content play state (S405), the user terminal 120*a* suspends the play and enters the downloaded-content summary display state (S403).

Also, after completing the play in the content play state (S405), the user terminal 120*a* enters the downloaded-content summary display state (S403).

Advantages of First Embodiment

As described above, according to the present embodiment, the connection request signal is transmitted to the content delivery terminal at a timing when it receives a selection of undownloaded content from the user, not at a timing when the user terminal enters the communication area of the content delivery terminal. This makes it possible to avoid unwanted connection by a user terminal that does not execute download, thus increasing the probability of avoiding occurrence of a connection restriction. Also, since the connection is started prior to an actual download request, the waiting time for the connection can be reduced, and the waiting time from occurrence of a download request until the start of communication.

(Variations)

<Overview of Content Delivery System>

Figure 19:
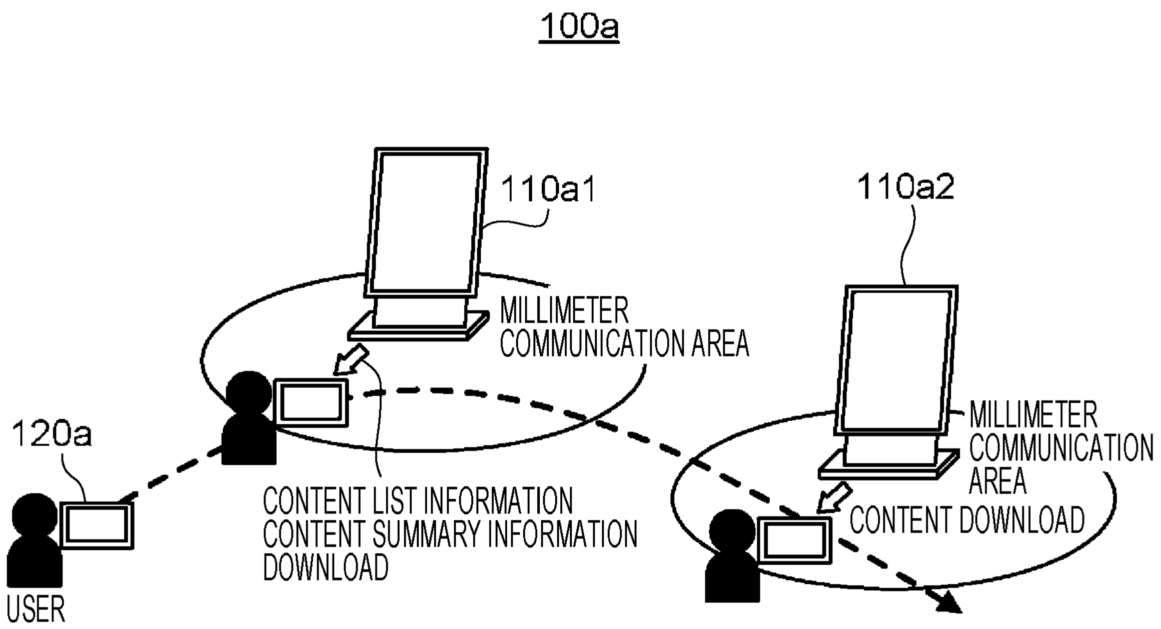
FIG. 19 is a diagram illustrating an overview of a content delivery system according to a variation of the first embodiment of the present disclosure.

In the present embodiment, a content delivery terminal 110*a*1 that performs millimeter wave communication and delivers content list information and content summary information and a content delivery terminal 110*a*2 that delivers content may be individually provided, as illustrated in FIG. 19. For example, the content delivery terminal 110*a*1 is placed at an entrance of a gallery, and the content delivery terminal 110*a*2 is placed adjacent to each artwork. Thus, after entering the gallery, a user can first see a list of displayed artworks by using the user terminal 120*a*, and at a place near an artwork the user is going to appreciate, he or she can see content that explains the artwork.

The content delivery terminal 110*a*1 and the content delivery terminal 110*a*2 are placed at predetermined locations and perform millimeter-wave wireless communication with the user terminal 120*a* that is present in the millimeter-wave communication area (a local cell).

At a timing when the user terminal 120*a* enters the millimeter-wave communication area of the content delivery terminal 110*a*1 or at a timing when the user terminal 120*a* starts using the content delivery service in the millimeter-wave communication area, the user terminal 120*a* connects with the content delivery terminal 110*a*1 to download the content list information and the content summary information from the content delivery terminal 110*a*1. After completing the download of the content list information and the content summary information, the user terminal 120*a* disconnects the connection with the content delivery terminal 110*a*1.

Also, in the millimeter-wave communication area of the content delivery terminal 110*a*2, the user terminal 120*a* connects with the content delivery terminal 110*a*2 at a timing based on an operation of the user to download content from the content delivery terminal 110*a*2, as described above with reference to FIGS. 8 to 10. After completing the download of the content, the user terminal 120*a* disconnects the connection with the content delivery terminal 110*a*2.

Also, at a timing when the user terminal 120*a* moves out of the millimeter-wave communication area while being connected with the content delivery terminal 110*a*2, the user terminal 120*a* disconnects the connection with the content delivery terminal 110*a*2.

<Processing Flow of User Terminal>

Next, processing flows of the user terminal 120*a* according to a variation of the present embodiment will be described with reference to FIGS. 20 to 22. In the processing flows illustrated in FIGS. 20 to 22, steps that are common to the processing flows illustrated in FIGS. 12 to 14 are denoted by the same reference numerals in FIGS. 12 to 14, and descriptions thereof are omitted.

Figure 20:
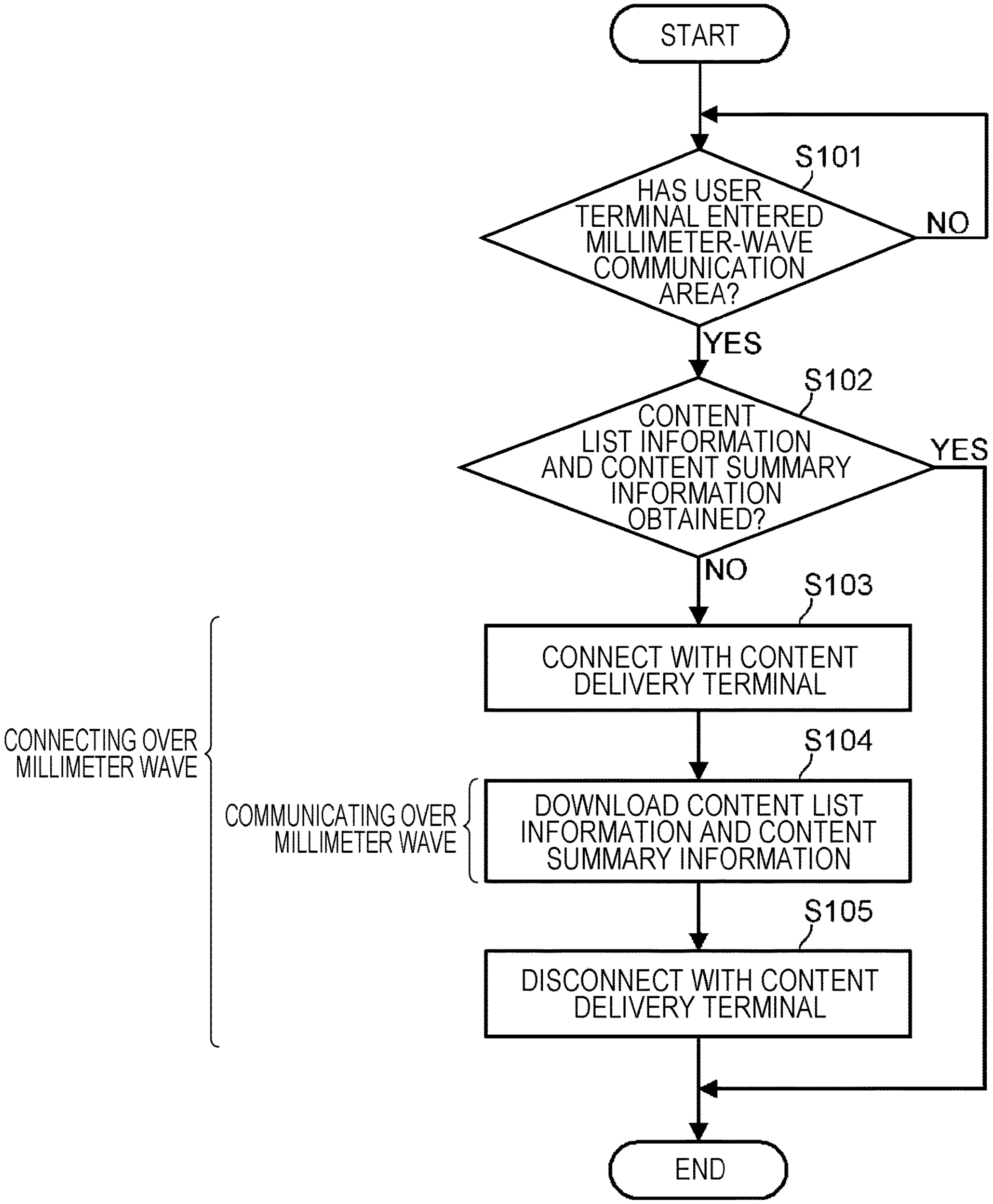
FIG. 20 is a flow diagram illustrating a processing procedure of a user terminal according to the variation of the first embodiment of the present disclosure.

FIG. 20 is a diagram illustrating a processing flow of the user terminal 120*a* when communicating with the content delivery terminal 110*a*1.

The user terminal 120*a* performs the processes in S101 to S105 described above in FIG. 12 in the millimeter-wave communication area of the content delivery terminal 110*a*1. This puts the user terminal 120*a* into a state in which the content list information and the content summary information are stored.

Figure 21:
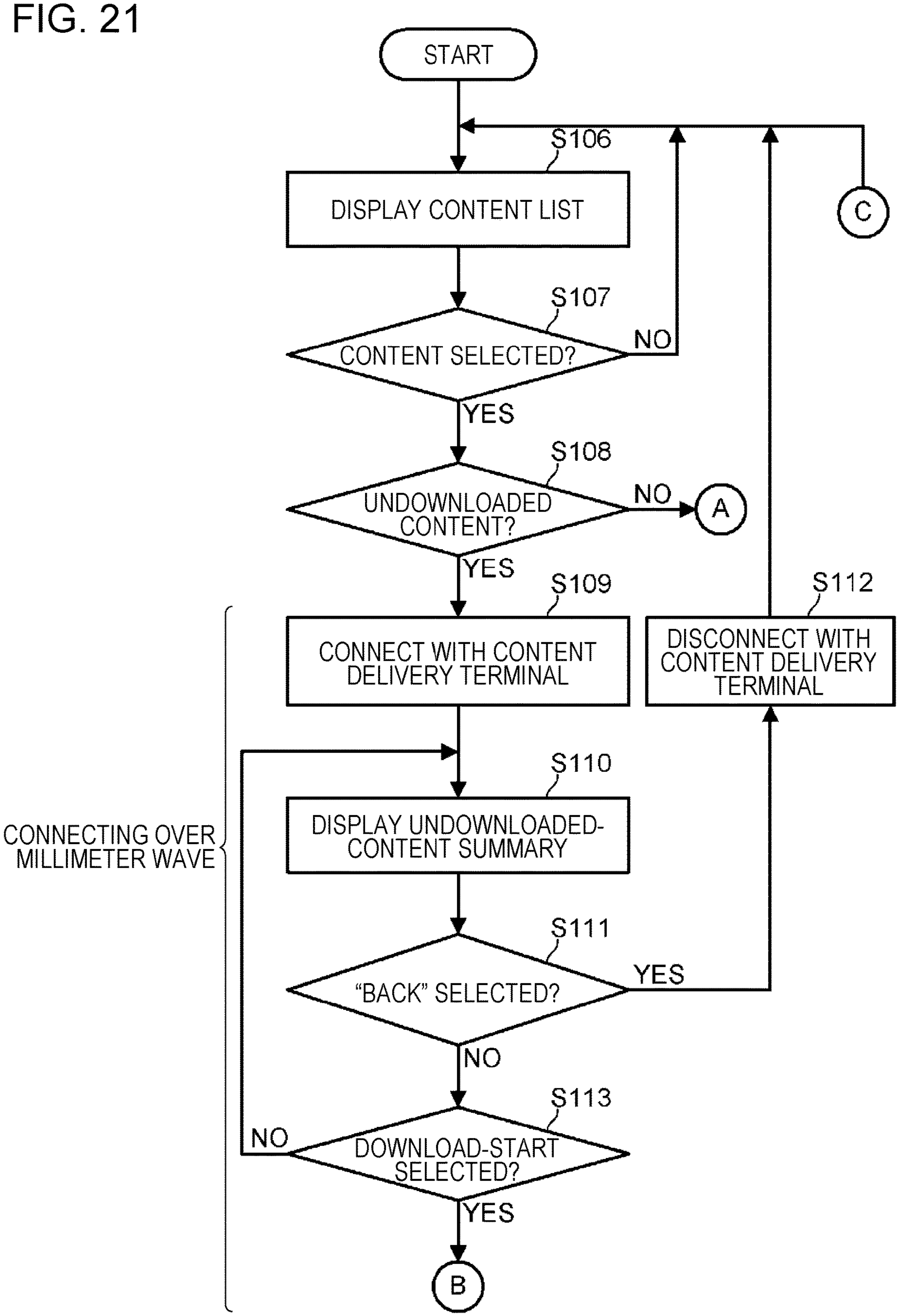
FIG. 21 is a flow diagram illustrating a processing procedure of the user terminal according to the variation of the first embodiment of the present disclosure.
Figure 22:
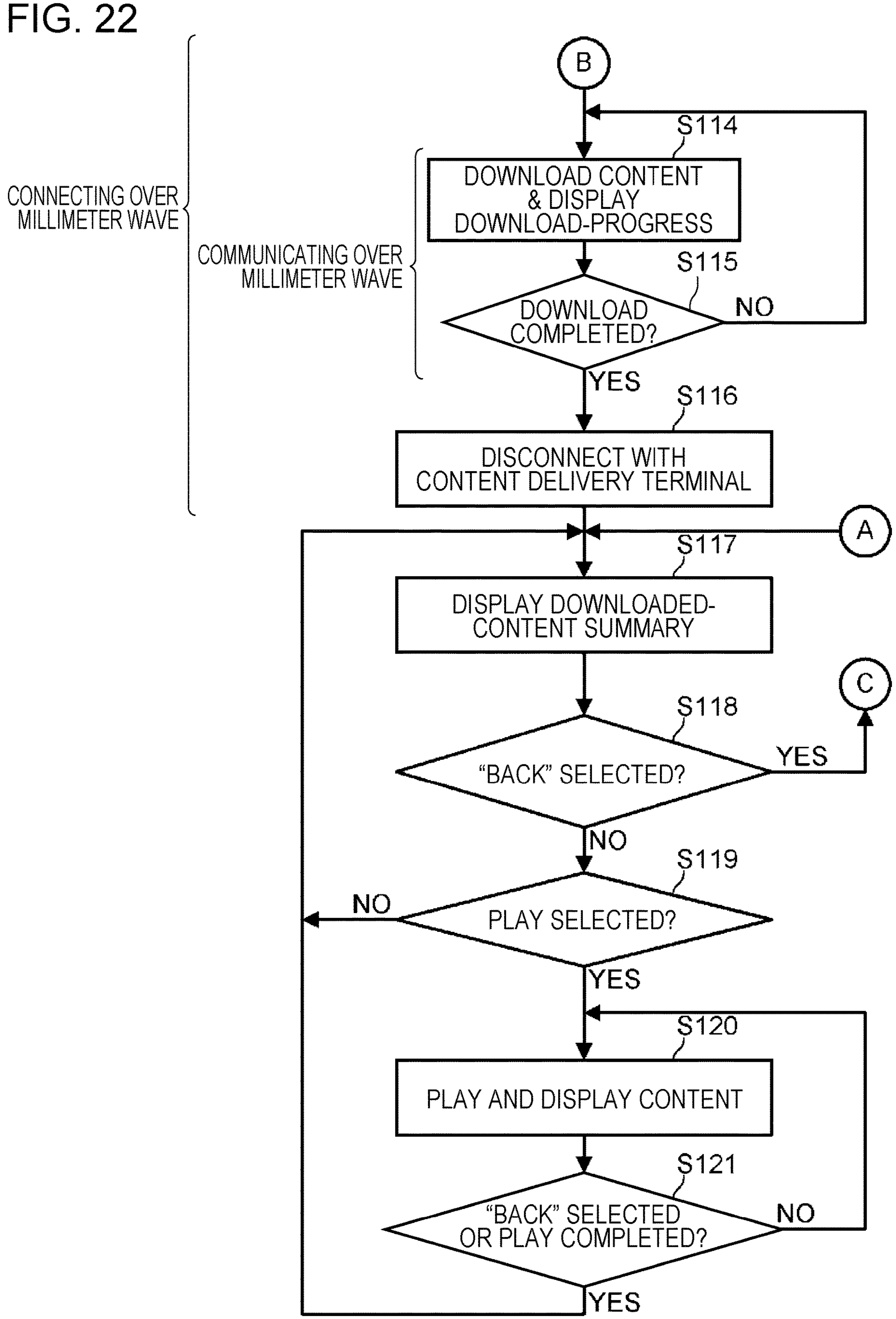
FIG. 22 is a flow diagram illustrating the processing procedure of the user terminal according to the variation of the first embodiment of the present disclosure.

FIGS. 21 and 22 illustrate a processing flow of the user terminal 120*a* when communicating with the content delivery terminal 110*a*2.

when communicating with the content delivery terminal 110*a*2, the user terminal 120*a* performs the processes in S106 to S121 described above in FIGS. 13 and 14. This allows the user terminal 120*a* to play and display the content selected by the user.

In the content delivery system 100*a* illustrated in FIG. 19, in an area other than the millimeter-wave communication areas of the content delivery terminals 110*a*1 and 110*a*2, even when another communication means does not exist, the user terminal 120*a* can execute download of the content in the millimeter-wave communication areas of the content delivery terminals 110*a*1 and 110*a*2 and may also be able to perform microwave communication or cellular communication. In FIG. 19, when microwave communication or cellular communication can be used, the content delivery terminal 110*a*1 can transmit the content list information and the content summary information to the user terminal 120*a* in an area larger than the millimeter-wave communication area.

Second Embodiment

<Overview of Content Delivery System>

First, an overview of a content delivery system 100*b* according to a second embodiment of the present disclosure will be described with reference to FIGS. 23 and 24.

Figure 23:
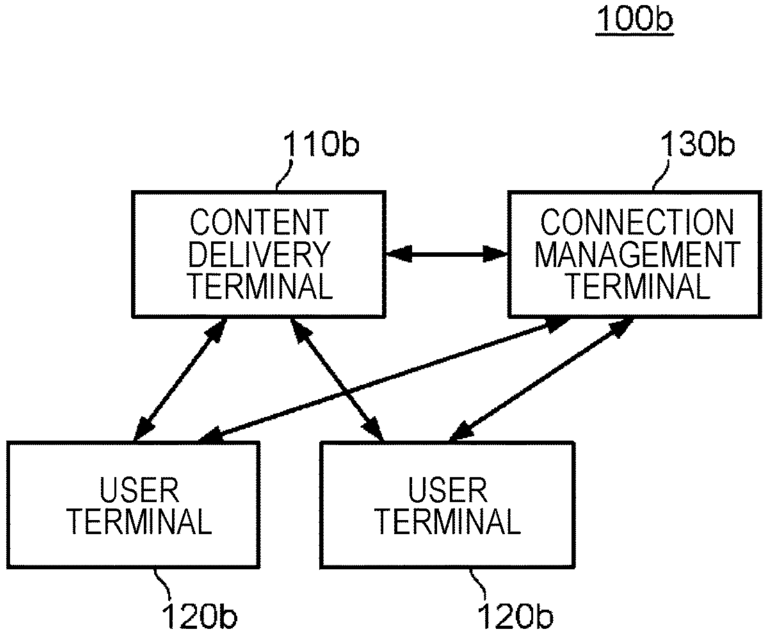
FIG. 23 is a diagram illustrating the configuration of a content delivery system according to a second embodiment of the present disclosure.

As illustrated in FIG. 23, the content delivery system 100*b* includes one or more content delivery terminals 110*b*, one or more user terminals 120*b*, and one connection management terminal 130*b*. FIG. 23 illustrates a case in which the number of content delivery terminals 110*b* is one.

Figure 24:
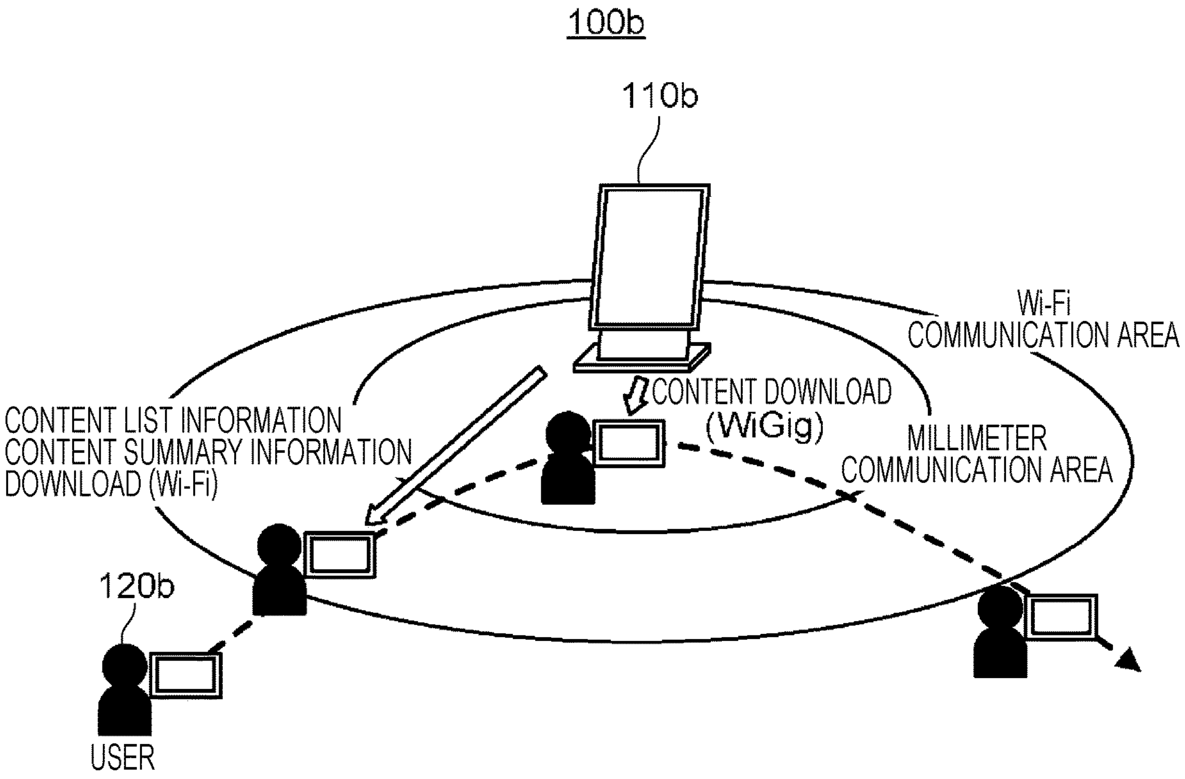
FIG. 24 is a diagram illustrating an overview of the content delivery system according to the second embodiment of the present disclosure.

The content delivery terminal 110*b* is placed at a predetermined location, performs millimeter wave wireless communication with the user terminal 120*b* that is present in a millimeter-wave communication area illustrated in FIG. 24 in accordance with a connection instruction from the connection management terminal 130*b*, and performs microwave wireless communication with the user terminal 120*b* that is present in a WiFi® communication area.

At a timing when the user terminal 120*b* enters the Wi-Fi communication area of the content delivery terminal 110*b* or at a timing when the user terminal 120*b* starts using the content delivery service in the Wi-Fi communication area, the user terminal 120*b* connects with the content delivery terminal 110*b* over a microwave to download the content list information and the content summary information from the content delivery terminal 110*b* over a microwave.

Also, at a timing based on an operation of the user in the millimeter-wave communication area of the content delivery terminal 110*b*, the user terminal 120*b* transmits a connection request signal to the connection management terminal 130*b* to connect with the content delivery terminal 110*b* to download content from the content delivery terminal 110*b*. At a timing when the download of the content is completed or at a timing based on an operation of the user, the user terminal 120*b* transmits a disconnection request to the connection management terminal 130*b* to disconnect the connection with the content delivery terminal 110*b*.

Also, at a timing when the user terminal 120*b* moves out of the millimeter-wave communication area while being connected with the content delivery terminal 110*b*, the user terminal 120*b* disconnects the connection with the content delivery terminal 110*b*.

The connection management terminal 130*b* manages the state of the connection between the content delivery terminal 110*b* and the user terminal 120*b*. Upon receiving a request signal from the user terminal 120*b*, the connection management terminal 130*b* controls the connection or disconnection between the content delivery terminal 110*b* and the user terminal 120*b*.

The content delivery system 100*b* may include a plurality of content delivery terminals 110*b*. In this case, at the timing of connection, the connection management terminal 130*b* can select a combination of optimum connections.

Also, the connection between the connection management terminal 130*b* and other terminals (the content delivery terminal 110*b* and the user terminals 120*b*) may be cable connections, not Wi-Fi. In this case, it is possible to reliably perform connection control at high speed.

Also, the content delivery terminal 110*b* and the connection management terminal 130*b* may be integrated into a single apparatus. In this case, it is possible to reliably perform connection control at high speed.

<Configuration of Content Delivery Terminal>

Figure 25:
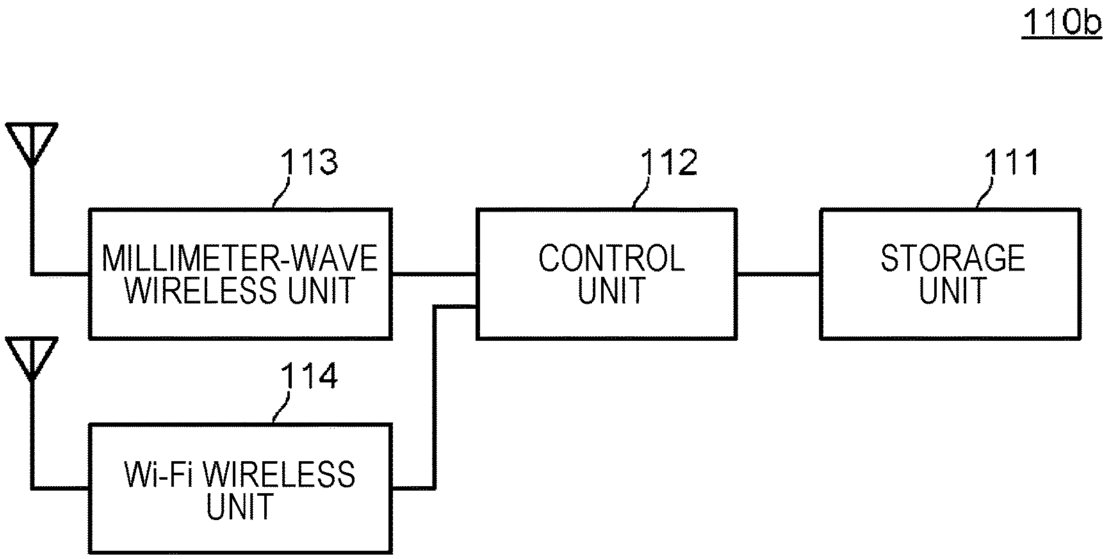
FIG. 25 is a block diagram of a content delivery terminal according to the second embodiment of the present disclosure.

Next, the configuration of the content delivery terminal 110*b* according to the present embodiment will be described with reference to FIG. 25. In the content delivery terminal 110*b* illustrated in FIG. 25, constituent portions that are common to the content delivery terminal 110*a* illustrated in FIG. 3 are denoted by the same reference numerals as those in FIG. 3, and descriptions thereof are omitted. Compared with the content delivery terminal 110*a* illustrated in FIG. 3, the content delivery terminal 110*b* illustrated in FIG. 25 differs in that a Wi-Fi wireless unit 114 is added, and the control unit 112 connects with the Wi-Fi wireless unit 114.

In accordance with a download request signal for content list information and content summary information, the download request signal being transmitted from the user terminal 120*b* and being input via the Wi-Fi wireless unit 114, the control unit 112 transmits the content list information and the content summary information stored in the storage unit 111 to the user terminal 120*b* via the Wi-Fi wireless unit 114. Also, in accordance with a download request signal for content, the download request signal being transmitted from the user terminal 120*b* and being input via the millimeter-wave wireless unit 113, the control unit 112 transmits the content stored in the storage unit 111 to the user terminal 120*b* via the millimeter-wave wireless unit 113.

The Wi-Fi wireless unit 114 performs predetermined wireless reception processing, such as downsampling and amplification, on a signal received from the user terminal 120*b* or the connection management terminal 130*b* over a microwave (such as 2.4 GHz or 5 GHz) and outputs a resulting signal to the control unit 112. Also, the Wi-Fi wireless unit 114 performs predetermined wireless transmission processing, such as upsampling and amplification, on information output from the control unit 112 and transmits resulting information to the user terminal 120*b* via an antenna over a microwave.

The content delivery terminal 110*b* may have a plurality of millimeter-wave wireless units 113. In this case, the connection management terminal 130*b* can select a combination of optimum connections.

<User Terminal>

Figure 26:
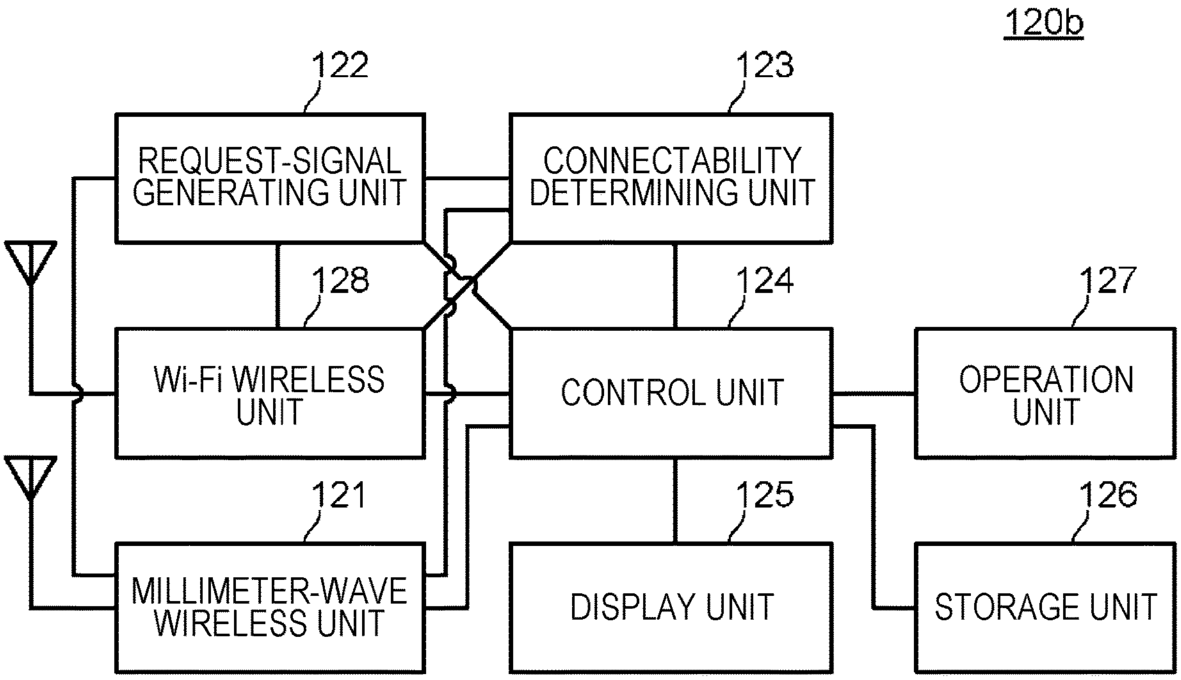
FIG. 26 is a block diagram of a user terminal according to the second embodiment of the present disclosure.

Next, the configuration of the user terminal 120*b* according to the present embodiment will be described with reference to FIG. 26. In the user terminal 120*b* illustrated in FIG. 26, constituent portions that are common to the user terminal 120*a* illustrated in FIG. 4 are denoted by the same reference numeral as those in FIG. 4, and descriptions thereof are omitted. Compared with the user terminal 120*a* illustrated in FIG. 4, the user terminal 120*b* illustrated in FIG. 26 differs in that a Wi-Fi wireless unit 128 is added, and the request-signal generating unit 122, the connectability determining unit 123, and the control unit 124 also connect with the Wi-Fi wireless unit 128.

The request-signal generating unit 122 generates various request signals in accordance with instructions from the control unit 124 and transmits the request signals to the content delivery terminal 110*b* or the connection management terminal 130*b* via the millimeter-wave wireless unit 121 or the Wi-Fi wireless unit 128.

As described in the first embodiment, the connectability determining unit 123 determines whether or not the user terminal 120*b* is in a state in which it can connect with the content delivery terminal 110*b* over a millimeter wave. In addition, the connectability determining unit 123 determines whether or not the user terminal 120*b* is present in the Wi-Fi communication area of the content delivery terminal 110*b* or whether or not the user terminal 120*b* is in a state in which it can connect with the content delivery terminal 110*b* over Wi-Fi.

For example, when a microwave beacon transmitted from the Wi-Fi wireless unit 114 in the content delivery terminal 110*b* is received via the Wi-Fi wireless unit 128, or when a microwave beacon transmitted from the Wi-Fi wireless unit 114 is received via the Wi-Fi wireless unit 128 and the reception power of the received beacon is larger than or equal to a threshold, the connectability determining unit 123 determines that the user terminal 120*b* has entered the Wi-Fi communication area and has entered a state in which it can connect with the content delivery terminal 110*b* over Wi-Fi.

The control unit 124 stores, in the storage unit 126, the content list information and the content summary information downloaded from the content delivery terminal 110*b* via the Wi-Fi wireless unit 128 and the content downloaded via the millimeter-wave wireless unit 121.

Also, the control unit 124 obtains a communication quality about the millimeter wave communication from, for example, a millimeter-wave band beacon received from the content delivery terminal 110*b* via the millimeter-wave wireless unit 121 and generates communication environment information. Further, the control unit 124 transmits the communication environment information to the connection management terminal 130*b* via the Wi-Fi wireless unit 128.

Figures 27, 28, 29:
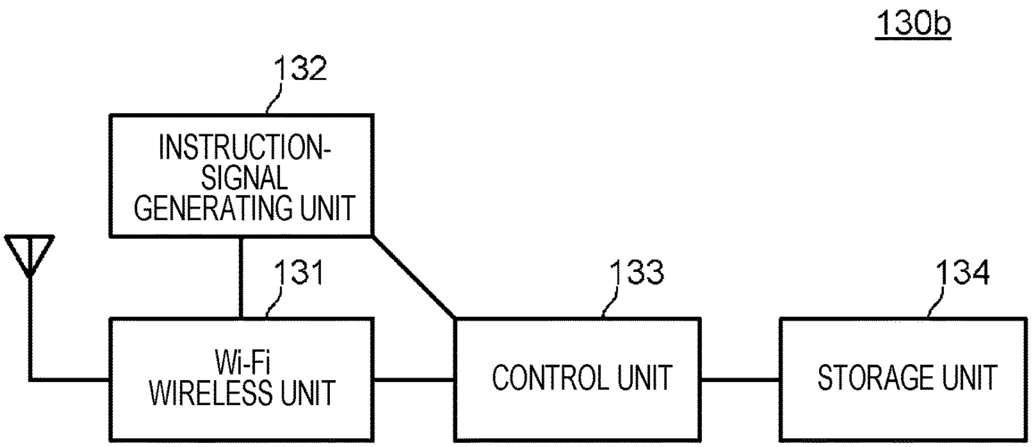
FIG. 27 is a table illustrating one example of communication environment information according to the second embodiment of the present disclosure.
FIG. 28 is a block diagram of a connection management terminal according to the second embodiment of the present disclosure.
FIG. 29 is a table illustrating a specific example of information management in a connection management database according to the second embodiment of the present disclosure.

The communication environment information includes items of "content delivery terminal name (ID)", "user terminal name (ID)", and "communication environment", and "state", as illustrated in FIG. 27. The "communication environment" refers to "outside the millimeter-wave communication area (millimeter wave connection is disabled)" or "within the millimeter-wave communication area (millimeter wave connection is enabled)+communication quality (RSSI)". The "state" is either "unconnected" or "connected" with respect to millimeter wave communication.

When the content delivery terminal 110*b* has a plurality of millimeter-wave wireless units 113, the control unit 124 generates pieces of communication environment information for the respective millimeter-wave wireless units 113. In this case, an item of "millimeter-wave wireless unit (ID)" is added to the communication environment information. Also, when channel information is also to be used, the control unit 124 generates pieces of communication environment information for respective channels. In this case, an item of "channel" is added to the communication environment information.

The Wi-Fi wireless unit 128 performs predetermined wireless transmission processing, such as upsampling and amplification, on various request signals output from the request-signal generating unit 122 and transmits resulting request signals to the content delivery terminal 110*b* or the connection management terminal 130*b* via the antenna over a microwave band (for example, 2.4 GHz band or 5 GHz band). Also, the Wi-Fi wireless unit 128 performs predetermined wireless reception processing, such as downsampling and amplification, on information received from the content delivery terminal 110*b* over a microwave and outputs resulting information to the control unit 124.

<Connection Management Terminal>

Next, the configuration of the connection management terminal 130*b* according to the present embodiment will be described with reference to FIG. 28. As illustrated in FIG. 28, the connection management terminal 130*b* is mainly constituted by a Wi-Fi wireless unit 131, an instruction-signal generating unit 132, a control unit 133, and a storage unit 134.

The Wi-Fi wireless unit 131 performs predetermined wireless transmission processing, such as upsampling and amplification, on various instruction signals output from the instruction-signal generating unit 132 and transmits resulting instruction signals to the content delivery terminal 110*b* or the user terminal 120*b* via the antenna over a microwave band. Also, the Wi-Fi wireless unit 131 performs predetermined wireless reception processing, such as downsampling and amplification, on information received from the user terminal 120*b* over a microwave and outputs resulting information to the control unit 133.

The instruction-signal generating unit 132 generates an instruction signal for issuing a connection or disconnection instruction, in accordance with an instruction from the control unit 133, and transmits the instruction signal to the content delivery terminal 110*b* or the user terminal 120*b* via the Wi-Fi wireless unit 131.

The control unit 133 updates a connection management database (DB) in the storage unit 134, based on a request signal and the communication environment information received from the user terminal 120*b* via the Wi-Fi wireless unit 131, determines the content delivery terminal 110*b* that serves as a connection partner of the user terminal 120*b*, based on the connection management DB, and instructs the instruction-signal generating unit 132 to generate an instruction signal. Upon receiving the communication environment information from an unregistered user terminal 120*b*, the control unit 133 additionally registers the user terminal 120*b*. Also, when the communication environment information is not received from the user terminal 120*b* for a certain period of time, or when the user terminal 120*b* moves out of the Wi-Fi communication area, the control unit 133 deletes the registered user terminal 120*b*.

The storage unit 134 stores a connection management DB therein. The control unit 133 updates the connection management DB.

<Connection Management DB>

Next, a specific example of the information managed by the connection management DB will be described with reference to FIG. 29. As illustrated in FIG. 29, in the connection management DB, the communication environment information is held for each combination of the content delivery terminal 110*b* and the user terminal 120*b*.

When the content delivery terminal 110*b* has a plurality of millimeter-wave wireless units 113, the connection management terminal 130*b* manages pieces of communication environment information for the respective millimeter-wave wireless units 113. In this case, an item of "millimeter-wave wireless unit (ID)" is added to each piece of communication environment information in the connection management DB. Also, when channel information is also to be used, the connection management terminal 130*b* manages the pieces of communication environment information for respective channels. In this case, an item of "channel" is added to each piece of communication environment information in the connection management DB. Also, for example, in a case that the user terminal 120*b* can obtain beam direction information of a received beacon when generating of the communication environment information, information of a beam direction is managed in the communication environment information. In this case, an item of "beam direction" is added to each piece of communication environment information in the connection management DB.

<Processing Flow of User Terminal>

Figure 30:
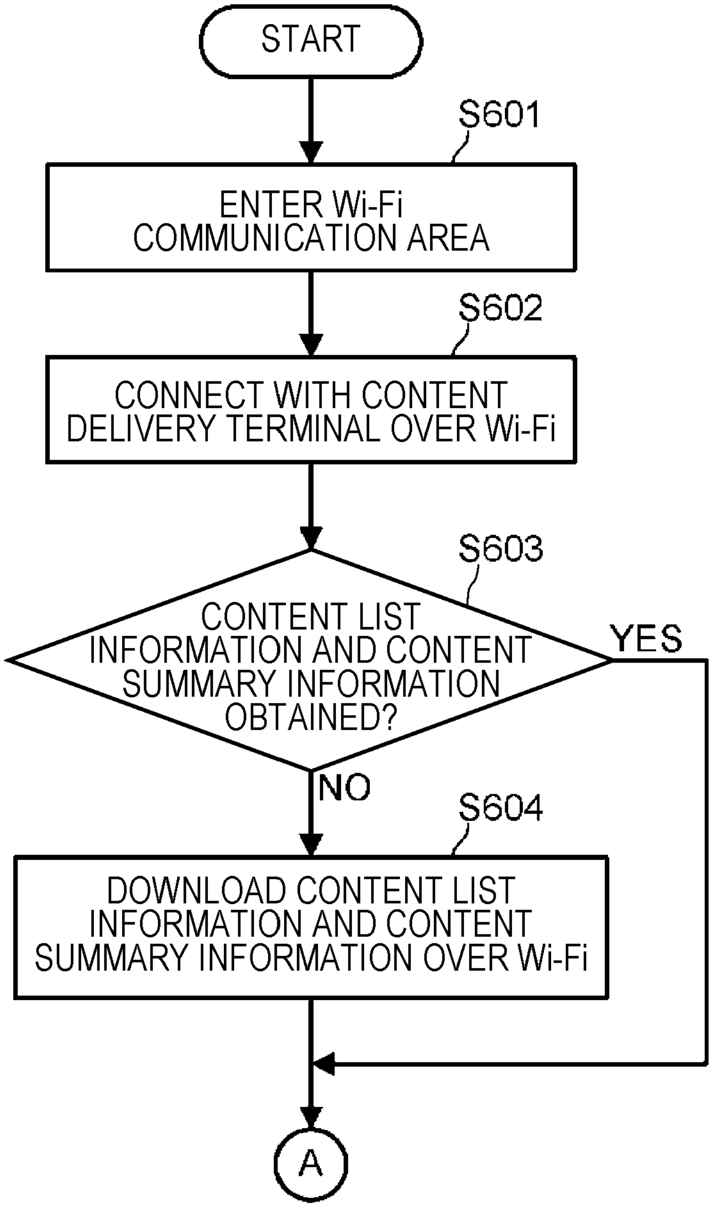
FIG. 30 is a flow diagram illustrating a processing procedure of the user terminal according to the second embodiment of the present disclosure.
Figure 31:
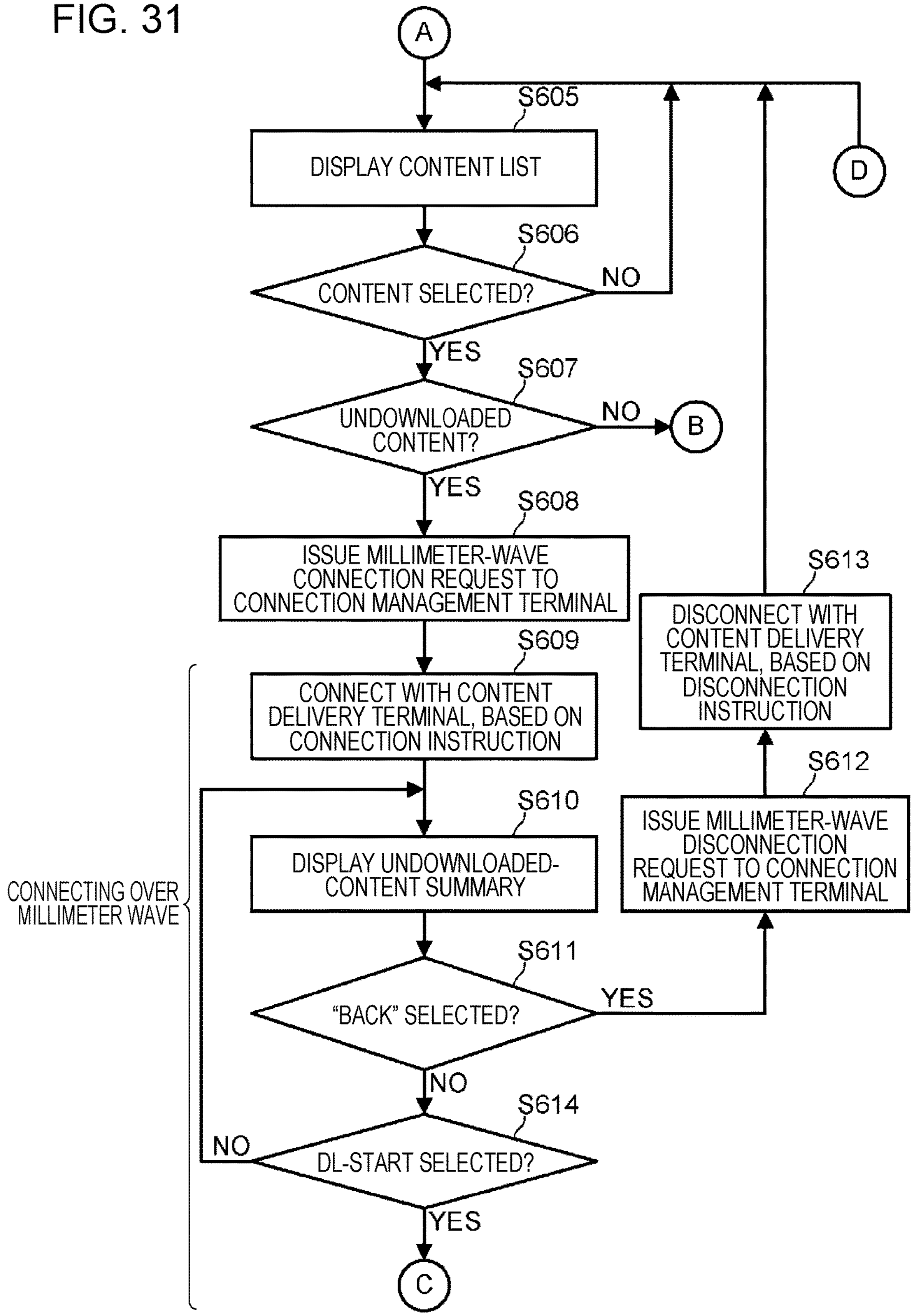
FIG. 31 is a flow diagram illustrating a processing procedure of the user terminal according to the second embodiment of the present disclosure.
Figure 32:
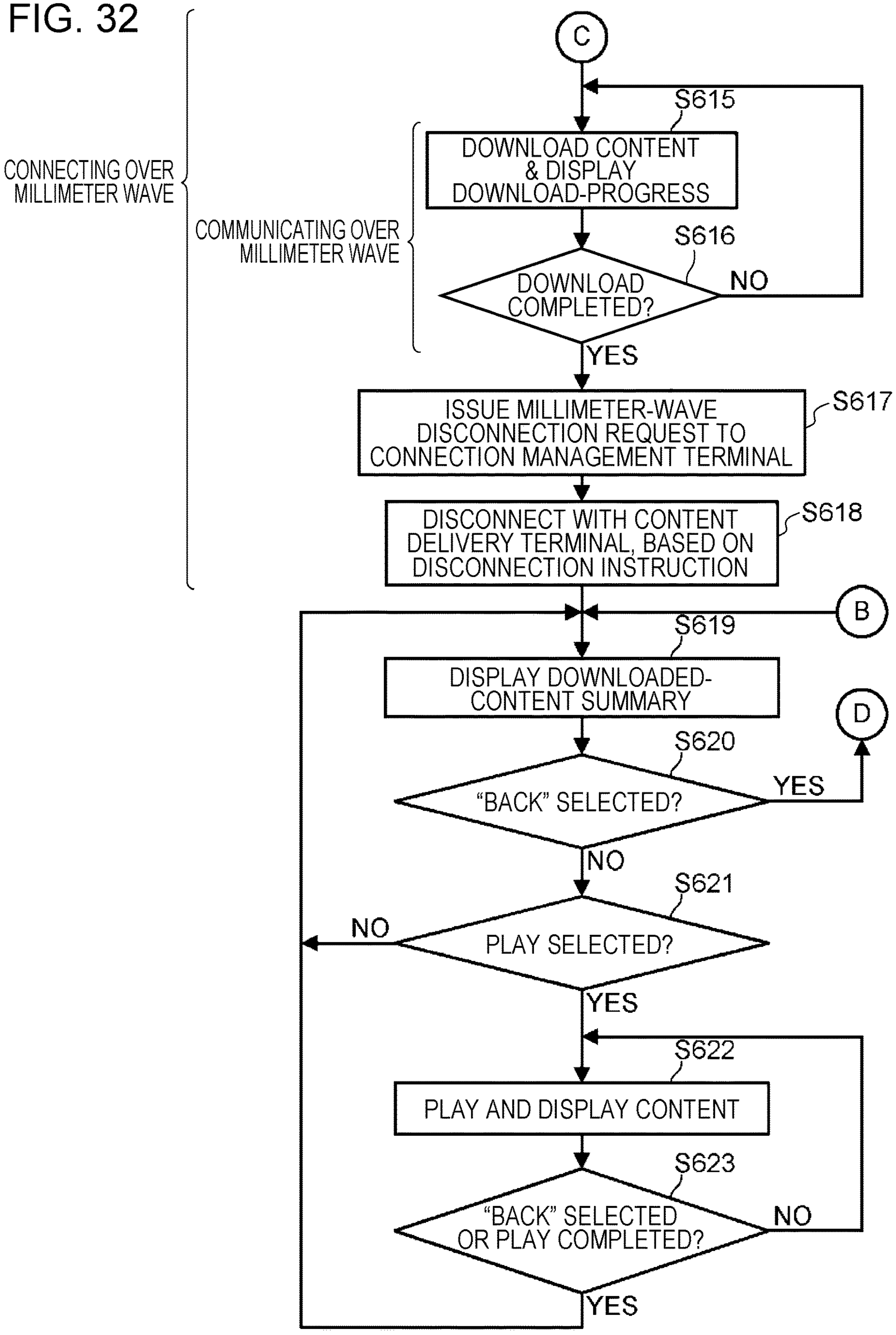
FIG. 32 is a flow diagram illustrating the processing procedure of the user terminal according to the second embodiment of the present disclosure.

Next, a processing flow of the user terminal 120*b* according to the present embodiment will be described with reference to FIGS. 30 to 32.

In S601, the connectability determining unit 123 in the user terminal 120*b* performs a Wi-Fi-communication-area determination process for determining whether or not the user terminal 120*b* has entered the Wi-Fi communication area of the content delivery terminal 110*b*.

When the user terminal 120*b* has entered the Wi-Fi communication area (after S601), the user terminal 120*b* connects with the content delivery terminal 110*b* over Wi-Fi in S602.

After the user terminal 120*b* connects with the content delivery terminal 110*b* over Wi-Fi (after S602), in S603, the control unit 124 refers to the storage unit 126 to determine whether or not the content list information and the content summary information have been obtained.

When the content list information and the content summary information have been obtained (S603: YES), the flow proceeds to S605.

When the content list information and the content summary information have not been obtained (S603: NO), in S604, the request-signal generating unit 122 transmits a download request signal for the content list information and the content summary information to the content delivery terminal 110*b* via the Wi-Fi wireless unit 128. The control unit 124 downloads the content list information and the content summary information from the content delivery terminal 110*b* via the Wi-Fi wireless unit 128 and stores the content list information and the content summary information in the storage unit 126.

In the case of YES in S603, or in S605, which is a next step of S604, the control unit 124 outputs the content list information stored in the storage unit 126 to the display unit 125 to cause a content list to be displayed on the screen 125A (see FIG. 5).

Next, in S606, based on operational information from the operation unit 127, the control unit 124 determines whether or not any of pieces of content displayed in the list is selected.

When any of the pieces of content displayed in the list is not selected (S606: NO), the flow returns to S605.

When one of the pieces of content displayed in the list is selected (S606: YES), in S607, the control unit 124 determines whether or not the selected content is undownloaded content, based on operational information from the operation unit 127 and information of the content stored in the storage unit 126.

When the selected content is downloaded content (S607: NO), the flow proceeds to S619.

On the other hand, when the selected content is undownloaded content (S607: YES), in S608 and S609, the user terminal 120*b* performs a process for connecting with the content delivery terminal 110*b*. Specifically, in S608, the user terminal 120*b* transmits a connection request signal to the connection management terminal 130*b* over a millimeter wave. Thereafter, in S609, the user terminal 120*b* connects with the content delivery terminal 110*b* after receiving a connection instruction signal from the connection management terminal 130*b*. Details of the connection process are described later.

Next, in S610, the control unit 124 outputs the content summary information of the undownloaded content stored in the storage unit 126 to the display unit 125 to cause a content summary to be displayed on the screen 125A (see FIG. 8).

Next, in S611, based on the user's operational information obtained via the operation unit 127, the control unit 124 determines whether or not the user selects "back" to the content list.

When the user selects "back" (S611: YES), in S612, the request-signal generating unit 122 transmits a disconnection request signal to the connection management terminal 130*b* via the Wi-Fi wireless unit 128. Thereafter, in S613, based on a disconnection instruction from the connection management terminal 130*b*, the user terminal 120*b* disconnects the connection with the content delivery terminal 110*b*. The flow returns to S605.

On the other hand, when the user does not select "back" (S611: NO), in S614, the control unit 124 determines whether or not the user selects start of downloading the content, based on operational information from the operation unit 127.

When the start of the download is not selected (S614: NO), the flow returns to S610.

On the other hand, when the start of the download is selected (S614: YES), in S615, the request-signal generating unit 122 transmits, via the millimeter-wave wireless unit 121, a download request signal for the content to the content delivery terminal 110*b* that is connected. The control unit 124 downloads the content from the content delivery terminal 110*b* via the millimeter-wave wireless unit 121 and stores the content in the storage unit 126. At this point, the display unit 125 displays the progress of the download on the screen 125A (see FIG. 9).

Next, in S616, the control unit 124 determines whether or not the download of the content is completed.

When the download of the content is not completed (S616: NO), the flow returns to S615, and the download is continued.

On the other hand, when the download of the content is completed (S616: YES), in S617, the request-signal generating unit 122 transmits a disconnection request signal to the connection management terminal 130*b* via the Wi-Fi wireless unit 128. Thereafter, in S618, based on a disconnection instruction from the connection management terminal 130*b*, the user terminal 120*b* disconnects the connection with the content delivery terminal 110*b*. Also, the control unit 124 stores, in the storage unit 126, the content whose download is completed.

In the case of NO in S607, or in S619, which is a next step of S618, the control unit 124 outputs the content summary information of the downloaded content stored in the storage unit 126 to the display unit 125 to cause a content summary to be displayed on the screen 125A (see FIG. 10).

Next, in S620, the control unit 124 determines whether or not the user has selected "back" to the content list.

When the user has selected "back" (S620: YES), the flow returns to S605.

On the other hand, when the user has not selected "back" (S620: NO), in S621, the control unit 124 determines whether or not the user has selected play of the content, based on operational information from the operation unit 127.

When the play of the content is not selected (S621: NO), the flow returns to S619.

On the other hand, when the play of the content is selected (S621: YES), in S622, the control unit 124 outputs information of the content stored in the storage unit 126 to the display unit 125 to cause the content to be play displayed on the screen 125A (see FIG. 11).

Next, in S623, the control unit 124 determines whether or not the user has selected "back" or whether or not the play of the content is completed.

When the user does has not selected "back" and the play of the content is not completed (S623: NO), the flow returns to S622, and the play of the content is continued.

On the other hand, when the user has selected "back" or the play of the content is completed (S623: YES), the flow returns to S619.

The above-described processing flow is continued, for example, until a power supply of the user terminal 120*b* is turned off or until the user requests stopping of the provision of the content delivery service. Also, the above-described processing flow is suspended when the user terminal 120*b* moves out of the millimeter-wave communication area of the content delivery terminal 110*b*.

When a certain amount of time has passed without selection of the start of the download (S612: NO) after the content summary of the undownloaded content in the above-described processing flow is displayed (S610), in S613 and S614, the connection with the content delivery terminal 110*b* may also be disconnected.

<Detailed Flow of Connection Process>

Figure 33:
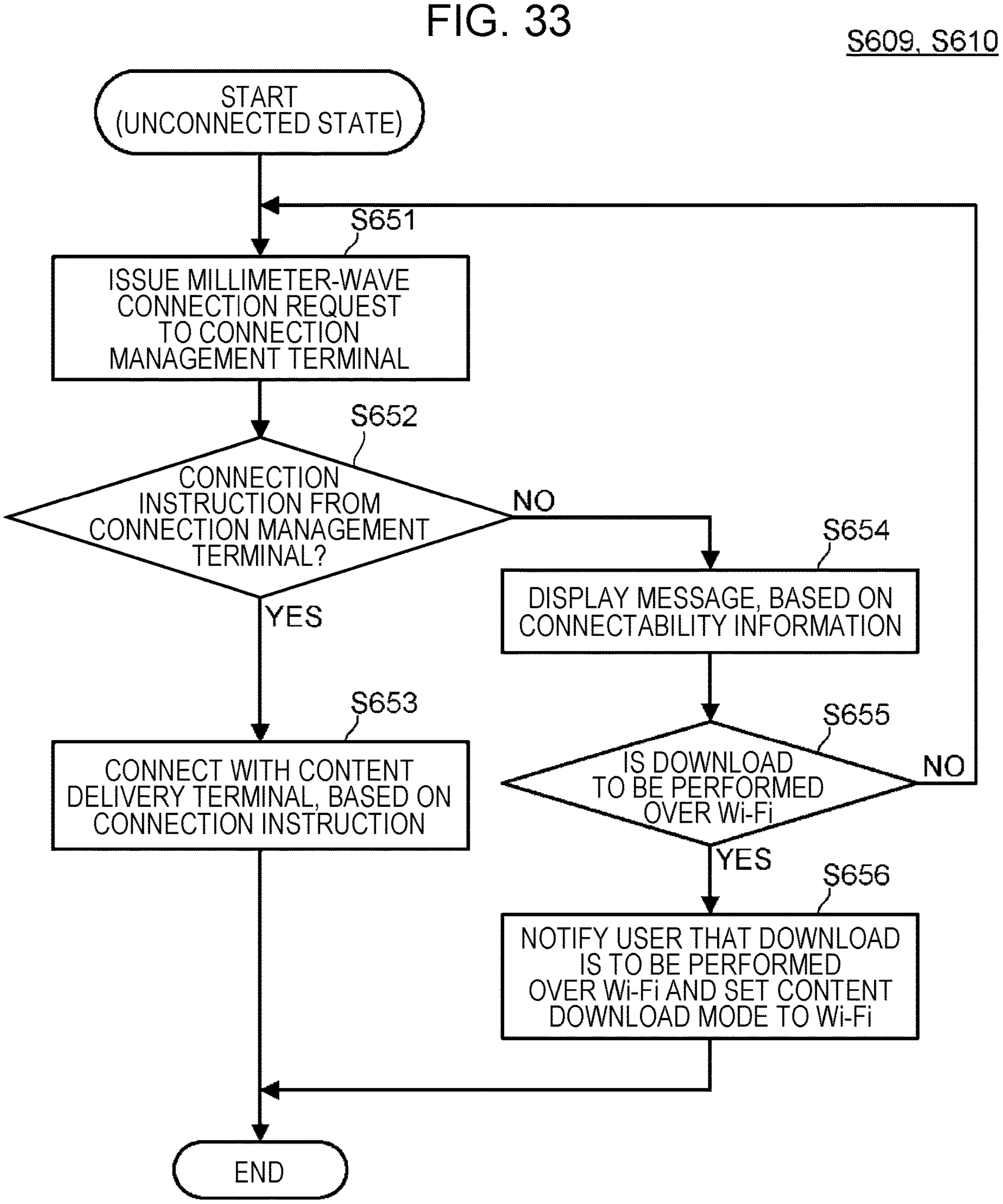
FIG. 33 is a flow diagram illustrating a detailed procedure of a connection process of the user terminal according to the second embodiment of the present disclosure.

Next, a detailed flow of the connection process in S608 and S609 described in FIG. 31 will be described with reference to FIG. 33.

In S651, the request-signal generating unit 122 in the user terminal 120*b* transmits a connection request signal for requesting millimeter wave connection to the connection management terminal 130*b* via the Wi-Fi wireless unit 128.

Thereafter, upon receiving a connection instruction signal from the connection management terminal 130*b* (S652: YES), the user terminal 120*b* connects with the content delivery terminal 110*b* in S653.

On the other hand, when the user terminal 120*b* receives a connection-disabled information without receiving a connection instruction signal from the connection management terminal 130*b* (S652: NO), the user terminal 120*b* displays a message based on the connection-disabled information S654. This message includes at least not performing connection over millimeter wave communication and a selection of whether or not download of the content over Wi-Fi is required. The above-described message may also include a reason why a connection over millimeter wave communication is not to be performed, for example, "outside the millimeter-wave communication area" or "maximum number of connections is reached". Also, what is displayed may be changed according to the reason. For example, for the "outside the millimeter-wave communication area", a message for urging the user to move into the area is displayed. Also, for the "maximum number of connections is reached", a message for having the user to wait for the connection for a while is displayed.

When the user selects the download of the content over Wi-Fi (S655: YES), in S656, the user terminal 120*b* notifies the user that the content is to be downloaded over Wi-Fi communication and sets a content download mode to Wi-Fi.

When the download of the content over Wi-Fi is not selected (S655: NO), the flow returns to S651.

<Flow of Millimeter-Wave-Communication Environment Information Obtaining Processing>

Figure 34:
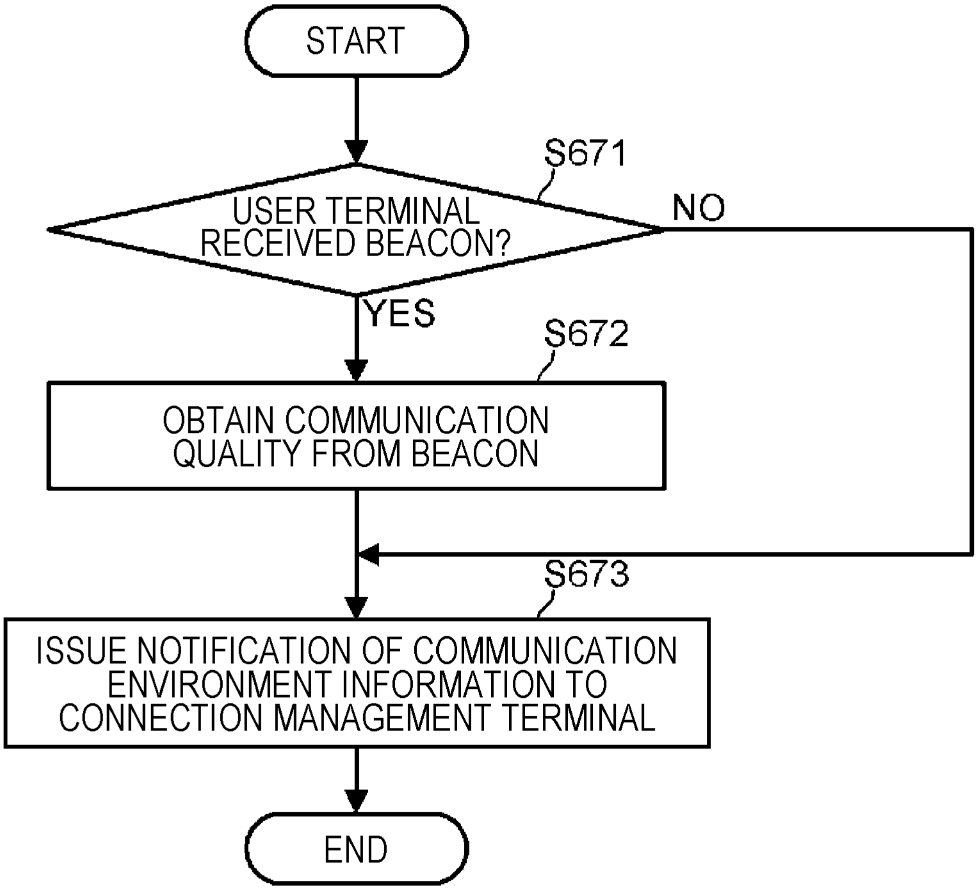
FIG. 34 is a flow diagram illustrating a detailed procedure of communication-environment-information obtaining processing of the user terminal according to the second embodiment of the present disclosure.

Next, a flow of millimeter-wave-communication environment information obtaining processing in the user terminal 120*b* will be described with reference to FIG. 34. As a premise, the content delivery terminal 110*b* is assumed to cyclically transmit a beacon.

In S671, the control unit 124 in the user terminal 120*b* periodically determines whether or not a beacon transmitted from the content delivery terminal 110*b* is received via the millimeter-wave wireless unit 121 or whether or not the reception power of a beacon received from the content delivery terminal 110*b* via the millimeter-wave wireless unit 121 is larger than or equal to a predetermined threshold.

When the beacon is received, or when the reception power is larger than or equal to the threshold (S671: YES) the control unit 124 determines that the user terminal 120*b* is within the millimeter-wave communication area, and obtains the communication quality from the beacon in S672.

On the other hand, when the beacon is not received, or when the reception power of the received beacon is smaller than the predetermined threshold (S671: NO), the control unit 124 determines that the user terminal 120*b* is outside the millimeter-wave communication area. After obtaining the communication quality (after S672) or after determining that the user terminal 120*b* is outside the millimeter-wave communication area, the control unit 124 transmits the communication environment information to the connection management terminal 130*b* via the Wi-Fi wireless unit 128 in S673. The above-described communication environment information obtaining processing may be performed intermittently according to a predetermined cycle.

In the present embodiment, the user terminal 120*b* may transmit a beacon, and the content delivery terminal 110*b* may determine whether or not the beacon is received and obtain the communication quality.

<Processing Flow of Content Delivery Terminal>

Figure 35:
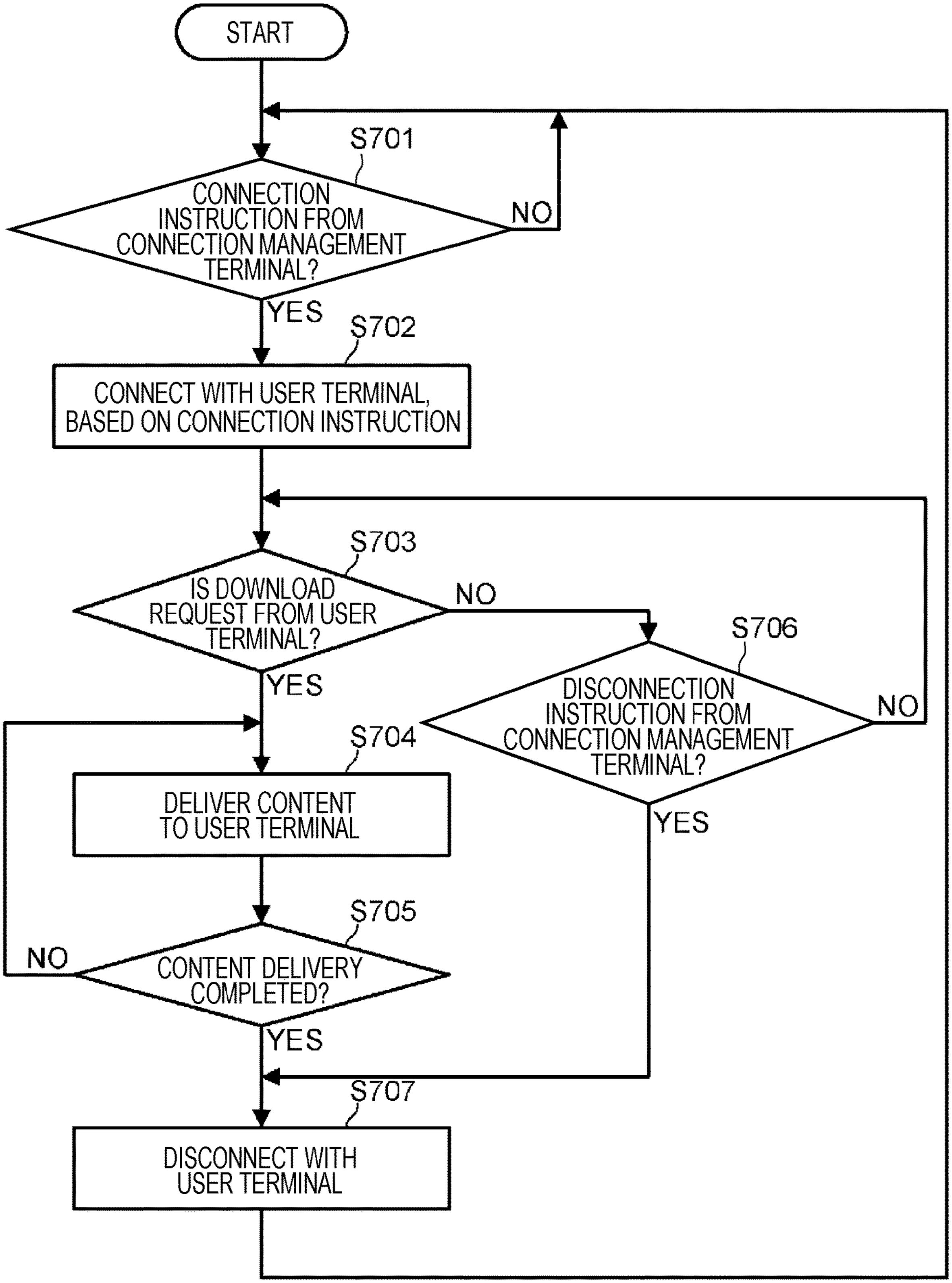
FIG. 35 is a diagram illustrating a processing procedure of the content delivery terminal according to the second embodiment of the present disclosure.

Next, a processing flow of the content delivery terminal 110*b* according to the present embodiment will be described with reference to FIG. 35.

In S701, the content delivery terminal 110*b* intermittently detects a connection instruction signal from the connection management terminal 130*b* (S701: NO).

Upon receiving a connection instruction signal (S701: YES), in S702, the content delivery terminal 110*b* performs a process for connecting with the user terminal 120*b*, based on the connection instruction.

Next, in S703, the content delivery terminal 110*b* intermittently detects a download request signal from the user terminal 120*b* or a disconnection instruction signal from the connection management terminal 130*b* (S703: NO, S706: NO).

Upon receiving a download request signal from the user terminal 120*b* (S703: YES), in S704, the content delivery terminal 110*b* delivers content list information and content summary information or content specified by the download request signal to the user terminal 120*b*.

When the delivery is completed (S705: YES), or when a disconnection instruction signal is received from the connection management terminal 130*b* (S703: NO, S706: YES), the content delivery terminal 110*b* disconnects the connection with the user terminal 120*b* in S707. The flow returns to S701.

<Processing Flow of Connection Management Terminal>

Next, a processing flow of the connection management terminal 130*b* according to the present embodiment will be described with reference to FIG. 36.

In S801, the connection management terminal 130*b* receives the communication environment information from the user terminal 120*b* via the Wi-Fi wireless unit 131.

Next, in S802, based on the communication environment information, the control unit 133 updates the connection management DB in the storage unit 134.

Thereafter, upon receiving a connection request signal from the user terminal 120*b* (S803: YES), the connection management terminal 130*b* performs a connection-partner determination process in S804. Details of the connection-partner determination process are described later.

When the content delivery terminal 110*b* that serves as a connection partner does not exist, it is determined in the connection-partner determination process that the connection is disabled, and communication-disabled information is generated (S805: NO), the instruction-signal generating unit 132 transmits the communication-disabled information to the user terminal 120*b* via the Wi-Fi wireless unit 131 in S806. The flow returns to S801.

On the other hand, when it is determined in the connection-partner determination process that the connection is enabled, the content delivery terminal 110*b* that serves as a connection partner is selected, and a connection instruction signal is generated (S805: YES), the instruction-signal generating unit 132 transmits the connection instruction signal to the content delivery terminal 110*b* and the user terminal 120*b* via the Wi-Fi wireless unit 131 in S807. Also, in S808, based on the result of the connection-partner determination process, the control unit 133 updates the connection management DB in the storage unit 134 from "unconnected" to "connected". The flow returns to S801.

When a connection request signal is not received from the user terminal 120*b* after S802 (S803: NO), and a disconnection request signal is received (S809: YES), the instruction-signal generating unit 132 transmits a disconnection instruction signal to the content delivery terminal 110*b* and the user terminal 120*b* via the Wi-Fi wireless unit 131 in S810. Also, in S811, the control unit 133 updates the connection management DB in the storage unit 134 from "connected" to "unconnected". The flow returns to S801.

After S802, when neither the connection request signal nor the disconnection request signal is received from the user terminal 120*b* (S803: NO, S809: NO), the flow returns to S801.

<Detailed Flow of Connection-Partner Determination Process>

Next, a detailed flow of the connection-partner determination process in S804 described in FIG. 36 will be described with reference to FIG. 37.

Figure 36:
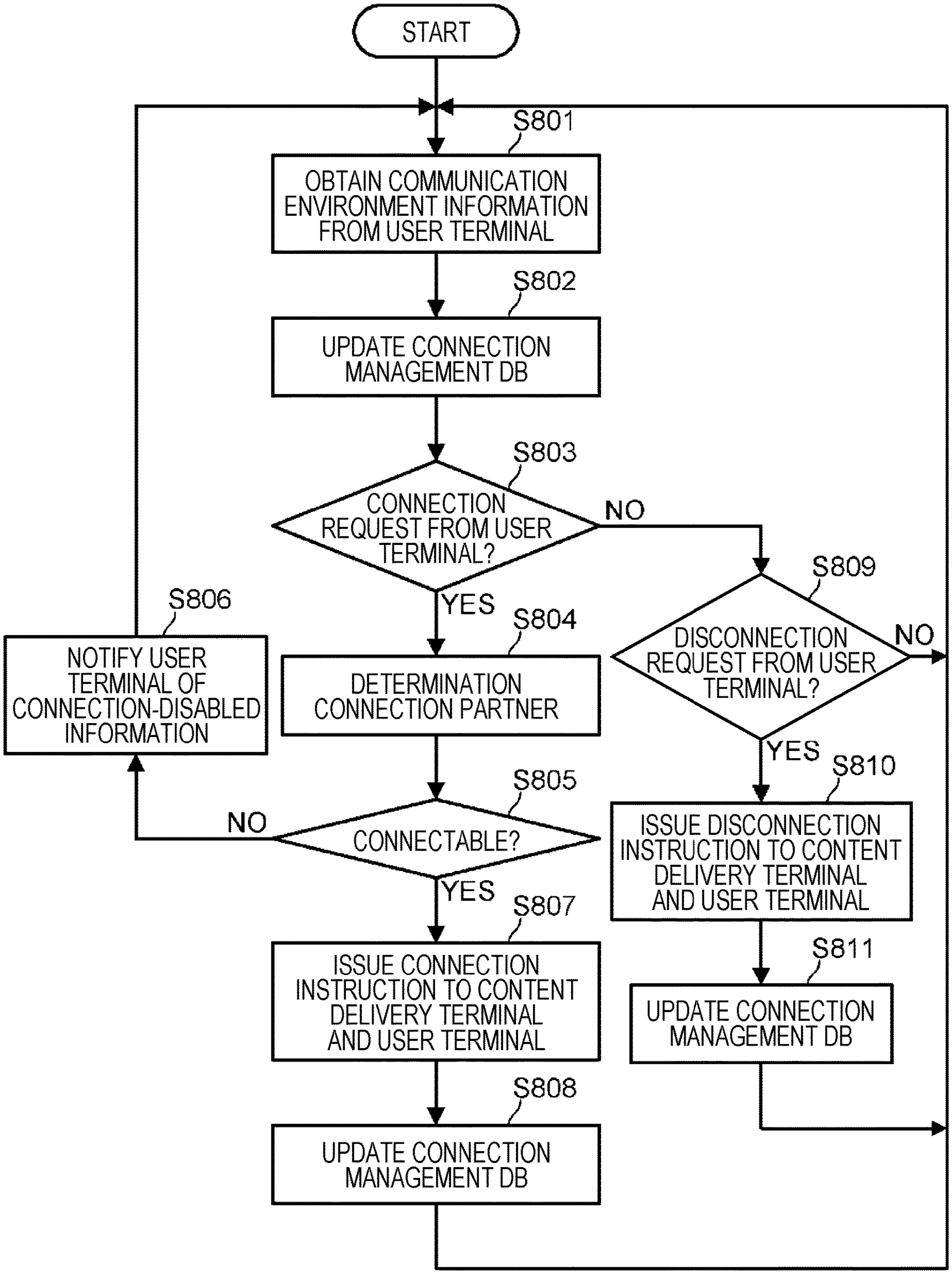
FIG. 36 is a diagram illustrating a processing procedure of the connection management terminal according to the second embodiment of the present disclosure.
Figure 37:
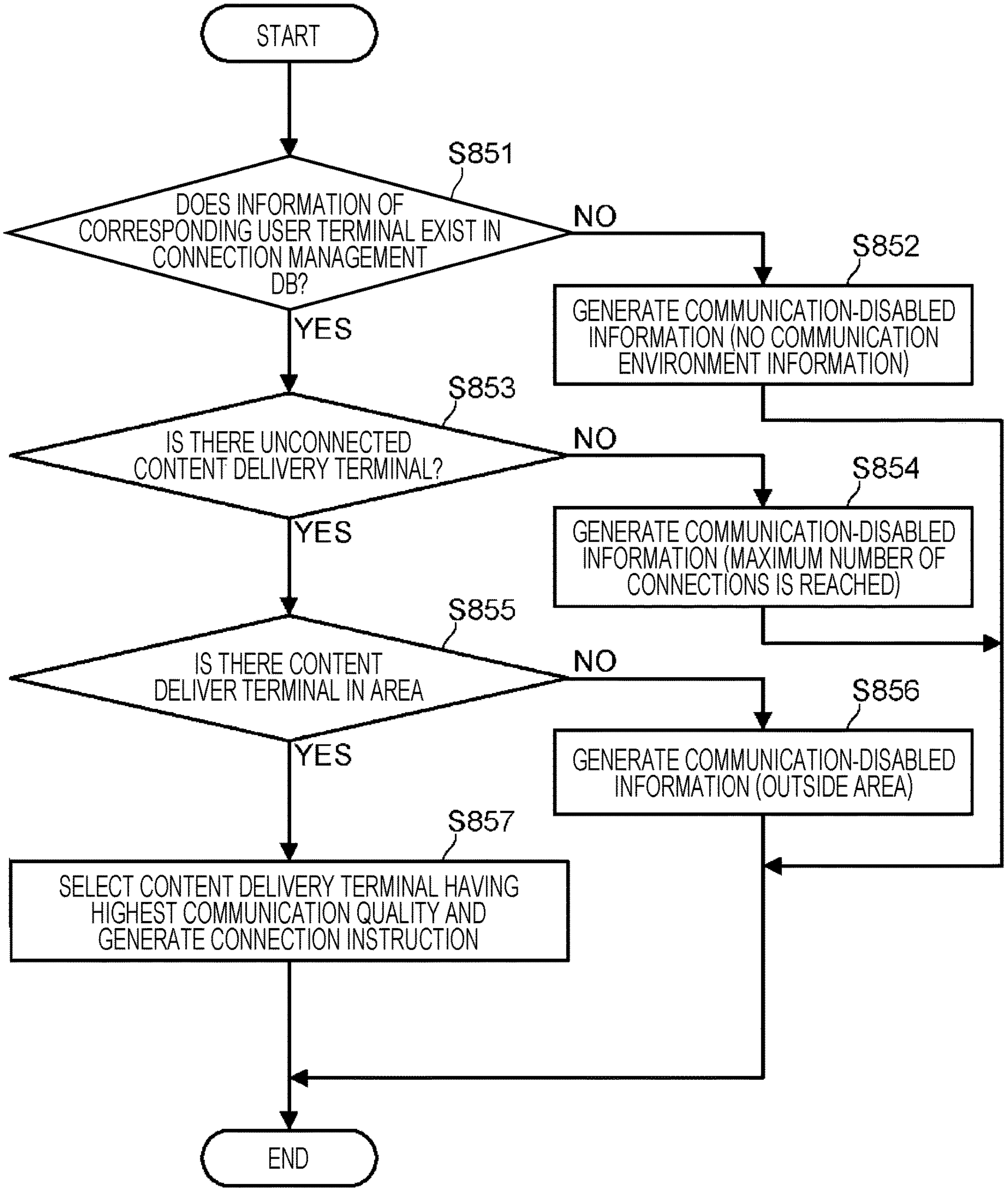
FIG. 37 is a flow diagram illustrating a detailed procedure of a connection-partner determination process of the connection management terminal according to the second embodiment of the present disclosure.

When a connection request signal is received from the user terminal 120*b* (S803 in FIG. 36: YES), in S851, the control unit 133 determines whether or not information of this user terminal 120*b* exists in the connection management DB, based on an ID of the user terminal 120*b* included in the connection request signal.

When information of the user terminal 120*b* does not exist in the connection management DB (S851: NO), in S852, the control unit 133 generates communication-disabled information indicating a reason "There is no communication environment information". In this case, the control unit 133 may instruct the user terminal 120*b* so as to wait until successfully obtaining communication environment information or so as to obtain communication environment information.

On the other hand, when information of the user terminal 120*b* exists in the connection management DB (S851: YES), in S853, the control unit 133 determines whether or not there is an unconnected content delivery terminal 110*b*.

When there is no unconnected content delivery terminal 110*b* (S853: NO), in S854, the control unit 133 generates communication-disabled information indicating a reason "maximum number of connections is reached".

On the other hand, when there is an unconnected content delivery terminal 110*b* (S853: YES), in S855, the control unit 133 determines whether or not there is a content delivery terminal 110*b* having a communication area within which the position of the user terminal 120*b* is located.

When there is no content delivery terminal 110*b* having a communication area within which the position of the user terminal 120*b* is located (S855: NO), in S856, the control unit 133 generates communication-disabled information indicating a reason "outside the communication area".

On the other hand, when there is a content delivery terminal 110*b* having a communication area within which the position of the user terminal 120*b* is located (S855: YES), in S857, the control unit 133 selects the content delivery terminal 110*b* having the highest communication quality as a connection partner, and the instruction-signal generating unit 132 generates a connection instruction signal. When channel information is also used, in S857, the control unit 133 may allocate an unused channel with higher priority than the communication quality. Also, when there is no other allocatable combination, the control unit 133 can also perform allocation with which a channel is redundantly used. Also, when the information of the beam direction is also used, allocation may also be performed with a combination of directions that do not affect another communication that is connected.

Although the connection is disabled when the maximum number of connections is reached in the above-described flow, the present embodiment is not limited thereto. A disconnection instruction may be issued to another connected combination, and after the disconnection is completed, a connection instruction may be issued with respect to the initial request. In this case, a time that has elapsed from the start of the connection may be added to the connection management DB so as to disconnect a combination whose connection time is long. Alternatively, a connection request signal from the user terminal 120*b*, the amount of content to be downloaded, and an estimated communication time of the download may be added to the connection management DB, and a time until another connection is disconnected may be estimated through comparison with the above-described connection elapsed time, and the estimated waiting time may be added to the connection-disabled information.

<Communication Sequence>

Figure 38:
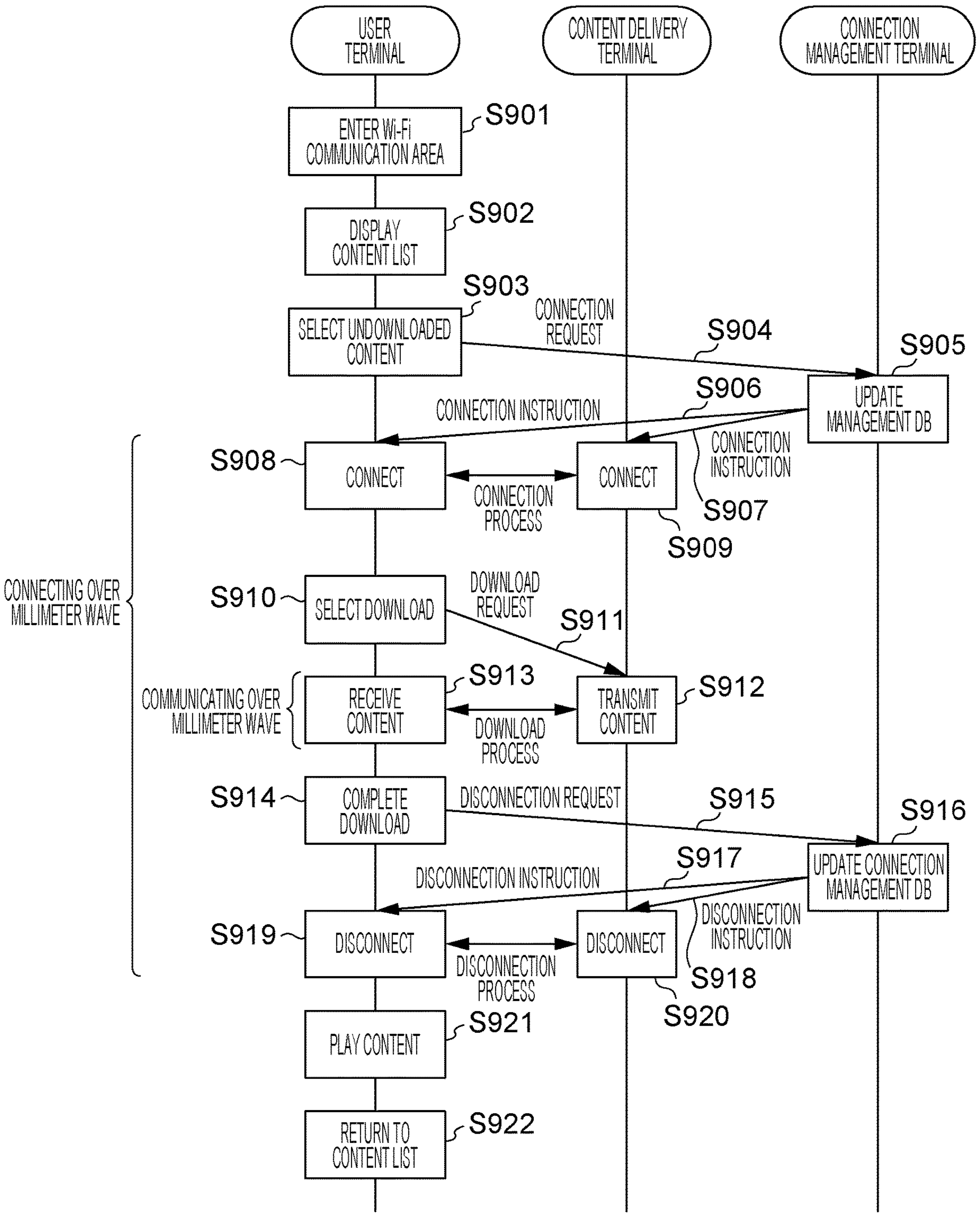
FIG. 38 is a sequence diagram illustrating a processing procedure when playing undownloaded content according to the second embodiment of the present disclosure.

Next, a communication sequence when playing undownloaded content, the sequence being executed among the content delivery terminal 110*b*, the user terminal 120*b*, and the connection management terminal 130*b* according to the present embodiment will be described with reference to FIG. 38.

First, after entering the Wi-Fi communication area of the content delivery terminal 110*b* in S901, the user terminal 120*b* displays a content list in S902. When the user terminal 120*b* does not hold the content list information, the user terminal 120*b* transmits a download request signal for the content list information and the content summary information to the content delivery terminal 110*b* over microwave communication and downloads the content list information and the content summary information from the content delivery terminal 110*b*.

Next, when the user selects undownloaded content in S903, the user terminal 120*b* transmits a connection request signal to the connection management terminal 130*b* in S904.

In S905, the connection management terminal 130*b* that has received the connection request signal determines the content delivery terminal 110*b* that serves as a connection partner of the user terminal 120*b*, and updates the connection management DB. Further, in S906 and S907, the connection management terminal 130*b* transmits a connection instruction signal to the content delivery terminal 110*b* and the user terminal 120*b*. Further, in S908 and S909, the content delivery terminal 110*b* and the user terminal 120*b* that receive the connection instruction signal from the connection management terminal 130*b* perform a connection process.

Next, when the user selects the download in S910, the user terminal 120*b* transmits a download request signal for the content to the content delivery terminal 110*b* in S911 and the content delivery terminal 110*b* and the user terminal 120*b* perform a download process in S912 and S913. In the download process, the content delivery terminal 110*b* transmits the content, and the user terminal 120*b* receives the content.

After the download process is completed in S914, the user terminal 120*b* transmits a disconnection request signal to the connection management terminal 130*b* in S915.

In S916, the connection management terminal 130*b* that has received the disconnection request signal updates the connection management DB. Further, in S917 and S918, the connection management terminal 130*b* transmits a disconnection instruction signal to the content delivery terminal 110*b* and the user terminal 120*b*. In S919 and S920, the content delivery terminal 110*b* that has received the disconnection instruction signal and the user terminal 120*b* perform a disconnection process. At the same time, in S921, the user terminal 120*b* plays the content.

After the play of the content is completed, the user terminal 120*b* returns the display to the content list display in S922.

Although, in the above description, the user terminal 120*b* transmits a disconnection request signal to the connection management terminal 130*b*, and the connection management terminal 130*b* transmits a disconnection instruction signal to the content delivery terminal 110*b* and the user terminal 120*b* to thereby disconnect the millimeter wave connection and update the connection management DB, the present embodiment is not limited thereto. The user terminal 120*b* may transmit a disconnection request signal to the content delivery terminal 110*b* to disconnect the millimeter wave connection, and the user terminal 120*b* may notify the connection management terminal 130*b* of the disconnection to thereby update the connection management DB.

Also, although, in the above description, the download request for content is transmitted from the user terminal 120*b* to the content delivery terminal 110*b* over millimeter wave communication, the present embodiment is not limited thereto, and the download request may be transmitted via the Wi-Fi wireless unit 131 over microwave communication.

Also, although, in the above description, the user terminal 120*b* generates communication environment information by using a millimeter wave beacon signal received from the content delivery terminal 110*b*, and notifies the connection management terminal 130*b* of the communication environment information, the present embodiment is not limited thereto. The content delivery terminal 110*b* may generate communication environment information by using a millimeter wave communication signal received from the user terminal 120*b* and may notify the connection management terminal 130*b* of the communication environment information. In this case, collecting a larger number of pieces of communication environment information makes it possible to enhance the accuracy of the connection management DB to allow the connection management terminal 130*b* to determine an optimum connection.

Advantages of Second Embodiment

As described above, according to the present embodiment, a connection request signal is transmitted to a connection management terminal at a timing when selection of undownloaded content is received from a user, not at a timing when the user terminal enters the millimeter-wave communication area of a content delivery terminal. This makes it possible to avoid an unnecessary connection by a user terminal that does not execute download and makes it possible to increase the probability of avoiding occurrence of a connection restriction. Also, since the connection process for millimeter wave communication is started before an actual download request is issued, the waiting time for the connection can be reduced, and a waiting time from occurrence of the download request to the start of communication can be reduced. Also, since communication environment information of all user terminals is gathered in the connection management terminal, and a combination of connections in millimeter wave communication is determined, it is possible to determine an optimum connection.

The functional blocks used in the description of the above embodiments are typically realized as an LSI, which is an integrated circuit. These may be individually realized by single chips or may be realized by a single chip so as to include some or all of the functional blocks. Although the functional blocks are implemented by an LSI in this case, they may also be called an IC, a system LSI, a super LSI, or an ultra LSI depending on a difference in the degree of integration.

Also, the scheme for integrating the functional blocks into an integrated circuit is not limited to a scheme for LSI and may be realized using a dedicated circuit or a generalpurpose processor. The scheme for the integration may also use an FPGA (Field Programmable Gate Array) that can be programmed after manufacture of an LSI or a reconfigurable processor that allows reconfiguration of connections or settings of circuit cells in an LSI.

In addition, when a technology for circuit integration that replaces LSI becomes available with the advancement of semiconductor technology or another derivative technology, such a technology may also naturally be used to integrate the functional blocks. Application of biotechnology or the like is possible.

The present disclosure can be realized by any kind of apparatus, device or system having a function of communication, which is referred to as a communication apparatus.

Some non-limiting examples of such communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

<Summary of the Present Disclosure>

A wireless communication apparatus in the present disclosure includes: connectability determining circuitry that determines connectability over a millimeter wave band with respect to a content delivery apparatus that delivers one or more pieces of content; request-signal generating circuitry that generates a connection request signal for issuing a request for connection over the millimeter wave band to the content delivery apparatus; and wireless circuitry that performs wireless communication with the content delivery apparatus over the millimeter wave band to download the one or more pieces of content from the content delivery apparatus and to transmit the connection request signal to the content delivery apparatus. When a determination result of the connectability indicates that the connection is enabled, the request-signal generating circuitry generates the connection request signal from when undownloaded content of the one or more pieces of content is selected until download of the selected undownloaded content is requested.

In the wireless communication apparatus in the present disclosure, when the download of the selected undownloaded content is requested, the request-signal generating circuitry may generate a download request signal indicating a download request for the undownloaded content.

In the wireless communication apparatus in the present disclosure, the connectability determining circuitry may determine that the connectability is enabled, when the wireless circuitry receives a beacon in a millimeter wave band which is transmitted from the content delivery apparatus, or when the wireless circuitry receives a beacon in a millimeter wave band which is transmitted from the content delivery apparatus and reception power of the received beacon is larger than or equal to a threshold.

In the wireless communication apparatus in the present disclosure, the request-signal generating circuitry may generate a disconnection request signal for requesting disconnection with the content delivery apparatus connected in the millimeter wave band; and the wireless circuitry may transmit the disconnection request signal to the content delivery apparatus when the download of the undownloaded content is completed, when a certain amount of time passes without occurrence of a download request after the undownloaded content is selected, or when the determination result of the connectability changes from enabled to disabled.

A wireless communication apparatus in the present disclosure includes: connectability determining circuitry that determines first connectability over a millimeter wave band with respect to a content delivery apparatus that delivers one or more pieces of content; request-signal generating circuitry that generates a connection request signal for issuing a request for connection over the millimeter wave band to the content delivery apparatus; and wireless circuitry that performs wireless communication with the content delivery apparatus over the millimeter wave band to download the one or more pieces of content from the content delivery apparatus and performs wireless communication with a connection management apparatus over a microwave wave band to transmit the connection request signal to the connection management apparatus that controls a connection with the content delivery apparatus. When a determination result of the first connectability indicates that the connection is enabled, the request-signal generating circuitry generates the connection request signal from when undownloaded content of the one or more pieces of content is selected until download of the selected undownloaded content is requested.

In the wireless communication apparatus in the present disclosure, the connectability determining circuitry may determine second connectability over a microwave band with respect to the content delivery apparatus; the request-signal generating circuitry may generate, when the determination of the second connectability indicates enabled, a first download request signal indicating a download request for a content list in which the one or more pieces of content are shown, and may generate, when the download of the selected undownloaded content is requested, a second download request signal indicating a download request for the undownloaded content; and the wireless circuitry may transmit the first download request signal to the content delivery apparatus over the microwave band and may transmit the second download request signal to the content delivery apparatus over the millimeter wave.

In the wireless communication apparatus in the present disclosure, the connectability determining circuitry may determine that the first connectability is enabled, when the wireless circuitry receives a first beacon in a millimeter wave band which is transmitted from the content delivery apparatus, or when the wireless circuitry receives a first beacon in a millimeter wave band which is transmitted from the content delivery apparatus and reception power of the received beacon is larger than or equal to a threshold.

In the wireless communication apparatus in the present disclosure, the request-signal generating circuitry may generate a disconnection request signal for requesting disconnection with the content delivery apparatus connected in the millimeter wave band, and may transmit the disconnection request signal to the connection management apparatus when the download of the undownloaded content is completed, when a certain amount of time passes without occurrence of a download request after the undownloaded content is selected, or when the determination result of the first connectability changes from enabled to disabled.

A connection management apparatus in the present disclosure includes: instruction-signal generating circuitry that generates an instruction signal for a wireless communication apparatus that performs communication by using a millimeter wave band and a microwave band and a content delivery apparatus that delivers one or more pieces of content to the wireless communication apparatus; storage circuitry that holds, as a connection management database, communication environment information received from the wireless communication apparatus and a status of connection between the wireless communication apparatus and the content delivery apparatus; control circuitry that updates the connection management database, based on the communication environment information and a request signal received from the wireless communication apparatus; and wireless circuitry that performs wireless communication with the content delivery apparatus and the wireless communication apparatus over the microwave band. The control circuitry determines a connection partner, based on the connection management database, upon receiving a connection request signal generated by the wireless communication apparatus from when undownloaded content of the one or more pieces of content is selected until download of the selected undownloaded content is requested; the instruction-signal generating circuitry generates an instruction signal for issuing an instruction for connection over a millimeter wave band to a content delivery apparatus that is the connection partner and the wireless communication apparatus; and the wireless circuitry transmits the instruction signal to the content delivery apparatus that is the connection partner and the wireless communication apparatus.

A content delivery system in the present disclosure is a content delivery system including content delivery apparatus that delivers one or more pieces of content and a wireless communication apparatus that performs wireless communication with the content delivery apparatus by using a millimeter wave band. The wireless communication apparatus includes: connectability determining circuitry that determines connectability over a millimeter wave band with respect to the content delivery apparatus; request-signal generating circuitry that generates a connection request signal for issuing a request for connection over the millimeter wave band to the content delivery apparatus; and wireless circuitry that performs wireless communication with the content delivery apparatus over the millimeter wave band to download the one or more pieces of content from the content delivery apparatus and to transmit the connection request signal to the content delivery apparatus. When a determination result of the connectability indicates that the connection is enabled, the request-signal generating circuitry generates the connection request signal from when undownloaded content of the one or more pieces of content is selected until download of the selected undownloaded content is requested. The content delivery apparatus includes: storage circuitry that stores the one or more pieces of content; and wireless circuitry that performs wireless communication with the wireless communication apparatus over a millimeter wave band. The wireless circuitry starts, upon receiving the connection request signal, connection with the wireless communication apparatus, the connection using the millimeter wave band, and transmits, upon receiving a download request for the undownloaded content, the undownloaded content of the one or more pieces of content stored in the storage circuitry to the wireless communication apparatus.

A content delivery system in the present disclosure is a content delivery system including a content delivery apparatus that delivers one or more pieces of content, a wireless communication apparatus that performs wireless communication with the content delivery apparatus by using a millimeter wave band and a microwave band, and a connection management apparatus that manages connection between the content delivery apparatus and the wireless communication apparatus over a millimeter wave band. The wireless communication apparatus includes: connectability determining circuitry that determines connectability over a millimeter wave band with respect to the content delivery apparatus; request-signal generating circuitry that generates a connection request signal for issuing a request for connection over the millimeter wave band to the content delivery apparatus; and wireless circuitry that performs wireless communication with the content delivery apparatus over a millimeter wave band to download the one or more pieces of content from the content delivery apparatus and that performs wireless communication with the connection management apparatus over a microwave band to transmit communication environment information and the connection request signal and to receive a connection instruction signal. When a determination result of the connectability indicates that the connection is enabled, the request-signal generating circuitry generates the connection request signal from when undownloaded content of the one or more pieces of content is selected until download of the selected undownloaded content is requested. The content delivery apparatus includes: storage circuitry that stores the one or more pieces of content; and wireless circuitry that performs wireless communication with the wireless communication apparatus by using a millimeter wave band and that performs wireless communication with the connection management apparatus over a microwave band to receive the connection instruction signal. The wireless circuitry starts connection with the wireless communication apparatus by using a millimeter wave band, upon receiving a connection instruction, and transmits the undownloaded content of the one or more pieces of content stored in the storage circuitry to the wireless communication apparatus, upon receiving a download request for the undownloaded content. The connection management apparatus includes: wireless circuitry that performs wireless communication with the content delivery apparatus and the wireless communication apparatus over a microwave band to receive the communication environment information and the connection request signal and to transmit the connection instruction signal; instruction-signal generating circuitry that generates an instruction signal for the content delivery apparatus and the wireless communication apparatus; and storage circuitry that holds, as a connection management database, the communication environment information received from the wireless communication apparatus and a status of connection between the wireless communication apparatus and the content delivery apparatus. The instruction-signal generating circuitry determines, when the wireless circuitry receives the connection request signal generated by the wireless communication apparatus from when the undownloaded content of the one or more pieces of content is selected until the download of the selected undownloaded content is requested, a connection partner over a millimeter wave band, based on the connection management database, and generates an instruction signal for issuing an instruction for connection over the millimeter wave band to the corresponding content delivery apparatus and the wireless communication apparatus.

A wireless communication method in the present disclosure is a wireless communication method for a wireless communication apparatus that performs wireless communication with a content delivery apparatus that delivers one or more pieces of content. The method includes: determining connectability over a millimeter wave band with respect to the content delivery apparatus to generate a connection request signal for issuing a request for connection over the millimeter wave band to the content delivery apparatus; transmitting, when a determination result of the connectability indicates that the connection is enabled, the connection request signal to the content delivery apparatus from when undownloaded content of the one or more pieces of content is selected until download of the selected undownloaded content is requested, to start wireless connection with the content delivery apparatus over the millimeter wave band; and downloading the one or more pieces of content from the content delivery apparatus.

A wireless communication method in the present disclosure is a wireless communication method for a wireless communication apparatus that performs wireless communication with a content delivery apparatus that delivers one or more pieces of content. The method includes: determining connectability over a millimeter wave band with respect to the content delivery apparatus; generating, when a determination result of the connectability indicates that connection is enabled, a connection request signal for issuing a request for connection over the millimeter wave band to the content delivery apparatus, from when undownloaded content of the one or more pieces of content is selected until download of the selected undownloaded content is requested; and starting, after the connection request signal is transmitted to the connection management apparatus by using wireless communication over a microwave band, the connection with the content delivery apparatus over the millimeter wave band to download the selected undownloaded content.

A wireless communication method in the present disclosure is a wireless communication method for a connection management apparatus that performs wireless communication with a wireless communication apparatus, which performs communication by using a millimeter wave band and a microwave band, and a content delivery apparatus, which delivers one or more pieces of content to the wireless communication apparatus, and that holds, as a connection management database, communication environment information received from the wireless communication apparatus and a status of connection between the wireless communication apparatus and the content delivery apparatus. The method includes: receiving a connection request signal generated by the wireless communication apparatus from when undownloaded content of the one or more pieces of content is selected until download of the selected undownloaded content is requested; determining a connection partner over a millimeter wave, based on the connection management database, when the connection request signal is received; and transmitting an instruction signal for issuing an instruction for connection over a millimeter wave band to the content delivery apparatus that is the connection partner and the wireless communication apparatus.

The present disclosure is preferably used for a user terminal that performs millimeter wave communication with a content delivery terminal to download content from the content delivery terminal.

What is claimed is:

1. A wireless communication apparatus comprising:

connectability determining circuitry that determines connectability over a millimeter wave band with respect to a content delivery apparatus that delivers one or more pieces of content;

request-signal generating circuitry that generates a connection request signal for issuing a request for connection over the millimeter wave band to the content delivery apparatus; and wireless circuitry that performs wireless communication with the content delivery apparatus over the millimeter wave band to download the one or more pieces of content from the content delivery apparatus and to transmit the connection request signal to the content delivery apparatus, wherein, when a determination result of the connectability indicates that the connection is enabled, the request-signal generating circuitry generates the connection request signal from when undownloaded content of the one or more pieces of content is selected until download of the selected undownloaded content is requested.

2. The wireless communication apparatus according to claim 1, wherein, when the download of the selected undownloaded content is requested, the request-signal generating circuitry generates a download request signal indicating a download request for the undownloaded content.

3. The wireless communication apparatus according to claim 1, wherein the connectability determining circuitry determines that the connectability is enabled, when the wireless circuitry receives a beacon in a millimeter wave band which is transmitted from the content delivery apparatus, or when the wireless circuitry receives a beacon in a millimeter wave band which is transmitted from the content delivery apparatus and reception power of the received beacon is larger than or equal to a threshold.

4. The wireless communication apparatus according to claim 1, wherein the request-signal generating circuitry generates a disconnection request signal for requesting disconnection with the content delivery apparatus connected in the millimeter wave band; and wherein the wireless circuitry transmits the disconnection request signal to the content delivery apparatus when the download of the undownloaded content is completed, when a certain amount of time passes without occurrence of a download request after the undownloaded content is selected, or when the determination result of the connectability changes from enabled to disabled.

5. A wireless communication apparatus comprising:
connectability determining circuitry that determines first connectability over a millimeter wave band with respect to a content delivery apparatus that delivers one or more pieces of content;
request-signal generating circuitry that generates a connection request signal for issuing a request for connection over the millimeter wave band to the content delivery apparatus; and
wireless circuitry that performs wireless communication with the content delivery apparatus over the millimeter wave band to download the one or more pieces of content from the content delivery apparatus and performs wireless communication with a connection management apparatus over a microwave wave band to transmit the connection request signal to the connection management apparatus that controls a connection with the content delivery apparatus,
wherein, when a determination result of the first connectability indicates that the connection is enabled, the request-signal generating circuitry generates the connection request signal from when undownloaded content of the one or more pieces of content is selected until download of the selected undownloaded content is requested.

6. The wireless communication apparatus according to claim 5,
wherein the connectability determining circuitry
determines second connectability over a microwave band with respect to the content delivery apparatus;
wherein the request-signal generating circuitry
generates, when the determination of the second connectability indicates enabled, a first download request signal indicating a download request for a content list in which the one or more pieces of content are shown, and
generates, when the download of the selected undownloaded content is requested, a second download request signal indicating a download request for the undownloaded content; and
wherein the wireless circuitry
transmits the first download request signal to the content delivery apparatus over the microwave band and transmits the second download request signal to the content delivery apparatus over the millimeter wave.

7. The wireless communication apparatus according to claim 5,
wherein the connectability determining circuitry determines that the first connectability is enabled, when the wireless circuitry receives a first beacon in a millimeter wave band which is transmitted from the content delivery apparatus, or when the wireless circuitry receives a first beacon in a millimeter wave band which is transmitted from the content delivery apparatus and reception power of the received beacon is larger than or equal to a threshold.

8. The wireless communication apparatus according to claim 5,
wherein the request-signal generating circuitry
generates a disconnection request signal for requesting disconnection with the content delivery apparatus connected in the millimeter wave band, and
transmits the disconnection request signal to the connection management apparatus when the download of the undownloaded content is completed, when a certain amount of time passes without occurrence of a download request after the undownloaded content is selected, or when the determination result of the first connectability changes from enabled to disabled.

9. A connection management apparatus comprising:
instruction-signal generating circuitry that generates an instruction signal for a wireless communication apparatus that performs communication by using a millimeter wave band and a microwave band and a content delivery apparatus that delivers one or more pieces of content to the wireless communication apparatus;
storage circuitry that holds, as a connection management database, communication environment information received from the wireless communication apparatus and a status of connection between the wireless communication apparatus and the content delivery apparatus;
control circuitry that updates the connection management database, based on the communication environment information and a request signal received from the wireless communication apparatus; and
wireless circuitry that performs wireless communication with the content delivery apparatus and the wireless communication apparatus over the microwave band,
wherein the control circuitry determines a connection partner, based on the connection management database, upon receiving a connection request signal generated by the wireless communication apparatus from when undownloaded content of the one or more pieces of content is selected until download of the selected undownloaded content is requested;
wherein the instruction-signal generating circuitry generates an instruction signal for issuing an instruction for connection over a millimeter wave band to a content delivery apparatus that is the connection partner and the wireless communication apparatus; and
wherein the wireless circuitry transmits the instruction signal to the content delivery apparatus that is the connection partner and the wireless communication apparatus.

10. A content delivery system comprising a content delivery apparatus that delivers one or more pieces of content and a wireless communication apparatus that performs wireless communication with the content delivery apparatus by using a millimeter wave band,
wherein the wireless communication apparatus comprises:
connectability determining circuitry that determines connectability over a millimeter wave band with respect to the content delivery apparatus;
request-signal generating circuitry that generates a connection request signal for issuing a request for connection over the millimeter wave band to the content delivery apparatus; and
wireless circuitry that performs wireless communication with the content delivery apparatus over the millimeter wave band to download the one or more pieces of content from the content delivery apparatus and to transmit the connection request signal to the content delivery apparatus;
wherein, when a determination result of the connectability indicates that the connection is enabled, the request-signal generating circuitry generates the connection request signal from when undownloaded content of the one or more pieces of content is selected until download of the selected undownloaded content is requested;

wherein the content delivery apparatus comprises:

storage circuitry that stores the one or more pieces of content; and wireless circuitry that performs wireless communication with the wireless communication apparatus over a millimeter wave band; and wherein the wireless circuitry starts, upon receiving the connection request signal, connection with the wireless communication apparatus, the connection using the millimeter wave band, and transmits, upon receiving a download request for the undownloaded content, the undownloaded content of the one or more pieces of content stored in the storage circuitry to the wireless communication apparatus.

11. A content delivery system comprising a content delivery apparatus that delivers one or more pieces of content, a wireless communication apparatus that performs wireless communication with the content delivery apparatus by using a millimeter wave band and a microwave band, and a connection management apparatus that manages connection between the content delivery apparatus and the wireless communication apparatus over a millimeter wave band, wherein the wireless communication apparatus comprises connectability determining circuitry that determines connectability over a millimeter wave band with respect to the content delivery apparatus, request-signal generating circuitry that generates a connection request signal for issuing a request for connection over the millimeter wave band to the content delivery apparatus, and wireless circuitry that performs wireless communication with the content delivery apparatus over a millimeter wave band to download the one or more pieces of content from the content delivery apparatus and that performs wireless communication with the connection management apparatus over a microwave band to transmit communication environment information and the connection request signal and to receive a connection instruction signal;

wherein, when a determination result of the connectability indicates that the connection is enabled, the request-signal generating circuitry generates the connection request signal from when undownloaded content of the one or more pieces of content is selected until download of the selected undownloaded content is requested;

wherein the content delivery apparatus comprises storage circuitry that stores the one or more pieces of content, and wireless circuitry that performs wireless communication with the wireless communication apparatus by using a millimeter wave band and that performs wireless communication with the connection management apparatus over a microwave band to receive the connection instruction signal;

wherein the wireless circuitry starts connection with the wireless communication apparatus by using a millimeter wave band, upon receiving a connection instruction, and transmits the undownloaded content of the one or more pieces of content stored in the storage circuitry to the wireless communication apparatus, upon receiving a download request for the undownloaded content;

wherein the connection management apparatus comprises wireless circuitry that performs wireless communication with the content delivery apparatus and the wireless communication apparatus over a microwave band to receive the communication environment information and the connection request signal and to transmit the connection instruction signal, instruction-signal generating circuitry that generates an instruction signal for the content delivery apparatus and the wireless communication apparatus, and storage circuitry that holds, as a connection management database, the communication environment information received from the wireless communication apparatus and a status of connection between the wireless communication apparatus and the content delivery apparatus; and wherein the instruction-signal generating circuitry determines, when the wireless circuitry receives the connection request signal generated by the wireless communication apparatus from when the undownloaded content of the one or more pieces of content is selected until the download of the selected undownloaded content is requested, a connection partner over a millimeter wave band, based on the connection management database, and generates an instruction signal for issuing an instruction for connection over the millimeter wave band to the corresponding content delivery apparatus and the wireless communication apparatus.

12. A wireless communication method for a wireless communication apparatus that performs wireless communication with a content delivery apparatus that delivers one or more pieces of content, the method comprising:

determining connectability over a millimeter wave band with respect to the content delivery apparatus to generate a connection request signal for issuing a request for connection over the millimeter wave band to the content delivery apparatus;

transmitting, when a determination result of the connectability indicates that the connection is enabled, the connection request signal to the content delivery apparatus from when undownloaded content of the one or more pieces of content is selected until download of the selected undownloaded content is requested, to start wireless connection with the content delivery apparatus over the millimeter wave band; and downloading the one or more pieces of content from the content delivery apparatus.

13. A wireless communication method for a wireless communication apparatus that performs wireless communication with a content delivery apparatus that delivers one or more pieces of content, the method comprising:

determining connectability over a millimeter wave band with respect to the content delivery apparatus;

generating, when a determination result of the connectability indicates that connection is enabled, a connection request signal for issuing a request for connection over the millimeter wave band to the content delivery apparatus, from when undownloaded content of the one or more pieces of content is selected until download of the selected undownloaded content is requested; and starting, after the connection request signal is transmitted to a connection management apparatus by using wireless communication over a microwave band, the connection with the content delivery apparatus over the millimeter wave band to download the selected undownloaded content.

14. A wireless communication method for a connection management apparatus that performs wireless communication with a wireless communication apparatus, which performs communication by using a millimeter wave band and a microwave band, and a content delivery apparatus, which delivers one or more pieces of content to the wireless communication apparatus, and that holds, as a connection management database, communication environment information received from the wireless communication apparatus and a status of connection between the wireless communication apparatus and the content delivery apparatus, the method comprising:

receiving a connection request signal generated by the wireless communication apparatus from when undownloaded content of the one or more pieces of content is selected until download of the selected undownloaded content is requested;

determining a connection partner over a millimeter wave, based on the connection management database, when the connection request signal is received; and transmitting an instruction signal for issuing an instruction for connection over a millimeter wave band to the content delivery apparatus that is the connection partner and the wireless communication apparatus.

* * * * *